US010319235B2

United States Patent
Gupta et al.

(10) Patent No.: US 10,319,235 B2
(45) Date of Patent: Jun. 11, 2019

(54) SYSTEMS AND METHODS FOR RESOLVING CONFLICTS BETWEEN PATHS OF DRIVERLESS VEHICLES BASED ON TIME REMAINING IN MEDIA ASSETS BEING CONSUMED IN THE DRIVERLESS VEHICLES

(71) Applicant: Rovi Guides, Inc., San Carlos, CA (US)

(72) Inventors: Vikram Makam Gupta, Karnataka (IN); Gyanveer Singh, Bihar (IN); Anjum Makkar, Punjab (IN); Aaina Beniwal, Haryana (IN)

(73) Assignee: Rovi Guides, Inc., San Jose, CA (US)

( * ) Notice: Subject to any disclaimer, the term of this patent is extended or adjusted under 35 U.S.C. 154(b) by 279 days.

(21) Appl. No.: 15/456,121

(22) Filed: Mar. 10, 2017

(65) Prior Publication Data

US 2018/0261098 A1 Sep. 13, 2018

(51) Int. Cl.
G08G 1/16 (2006.01)
H04N 7/18 (2006.01)
H04N 21/482 (2011.01)

(52) U.S. Cl.
CPC ............ G08G 1/163 (2013.01); G08G 1/166 (2013.01); H04N 7/181 (2013.01); H04N 21/4821 (2013.01)

(58) Field of Classification Search
CPC ........ G08G 1/163; G08G 1/166; H04N 7/181; H04N 21/4821
See application file for complete search history.

(56) References Cited

U.S. PATENT DOCUMENTS

| 8,965,621 | B1 | 2/2015 | Urmson et al. |
| 9,363,544 | B2 | 6/2016 | Tomita |
| 9,528,838 | B2 | 12/2016 | Okumura |
| 2014/0278029 | A1 | 9/2014 | Tonguz et al. |
| 2016/0097648 | A1 | 4/2016 | Hannah |
| 2019/0035278 | A1* | 1/2019 | Mishina ................. G08G 1/163 |

* cited by examiner

*Primary Examiner* — Thomas G Black
*Assistant Examiner* — Sze-Hon Kong
(74) *Attorney, Agent, or Firm* — Haley Guiliano LLP

(57) ABSTRACT

Systems and methods for resolving conflicts between paths of smart vehicles based on time remaining in media assets being consumed in the smart vehicles. For example, two smart vehicles may be traveling along routes that conflict (e.g., they will converge at a particular point in the routes and collide). In order to resolve the conflict, one vehicle is instructed to yield to the other vehicle until the path is clear. The vehicles are instructed based on whether one or both vehicles are displaying a media asset (e.g., a movie) to passengers, and the amount of time left in the media asset compared to the amount of time left until the vehicles reach their destinations.

20 Claims, 7 Drawing Sheets

SYSTEMS AND METHODS FOR RESOLVING CONFLICTS BETWEEN PATHS OF DRIVERLESS VEHICLES BASED ON TIME REMAINING IN MEDIA ASSETS BEING CONSUMED IN THE DRIVERLESS VEHICLES

BACKGROUND

In recent years, numerous advances have been made to automate the driving process for a variety of different vehicles, such as cars, boats, and planes. By utilizing sensors and communicating with other vehicles and/or central control facilities, smart vehicles present the opportunity for a user to enjoy a media asset instead of normally having had to concentrate on driving. In some instances, a conflict may arise between two smart vehicles (e.g., if both vehicles reach a traffic intersection at the same time) which needs to be resolved in order to avoid an adverse outcome (e.g., both vehicles entering the intersection at the same time and crashing into one another). Current systems resolve conflicts (e.g., which vehicle goes first) based on traffic rules or the speed/trajectory of the vehicles. However, these systems do not consider whether users in the smart vehicles are watching media assets in the calculation of which vehicle goes first.

SUMMARY

Systems and methods are described for resolving conflicts between paths of smart vehicles based on time remaining in media assets being consumed in the smart vehicles. For example, two smart vehicles may be traveling along routes that conflict (e.g., they will converge at a particular point in the routes and collide). In order to resolve the conflict, one smart vehicle is instructed to yield to the other smart vehicle until the path is clear. The vehicles are instructed based on whether one or both vehicles are displaying a media asset (e.g., a movie) to passengers and the amount of time left in the media asset compared to the amount of time left until the vehicles reach their destinations. In this way, the systems and methods may maximize a user's enjoyment of media assets by minimizing interruptions to media asset playback (e.g., a user reaching a destination before the media asset is over might require the user to switch to viewing on another device) by varying the length of their trip in an unobtrusive way (e.g., only when a conflict with another vehicle is determined).

The systems and methods described herein may be performed by control circuitry. In some embodiments, the control circuitry may be implemented at a central facility. For example, the control circuitry may be located in a server that determines and resolves conflicts for a plurality of smart vehicles. In some embodiments, the control circuitry may be implemented in a local node that communicates via a communication network with other nodes at other locations and/or a central control server (e.g., a distributed systems approach). In some embodiments, the control circuitry may be implemented in smart vehicles themselves. For example, two smart vehicles may determine a conflict between one another and communicate with one another to determine which vehicle should proceed first consistent with the above systems and methods. In other embodiments, the control circuitry may be configured to execute a media guidance application, which may perform the described systems and methods. Alternatively or additionally, the control circuitry may be implemented in any other suitable device configured to communicate with smart vehicles.

In some aspects, the control circuitry determines, based on a first current location of a first smart vehicle and a second current location of a second smart vehicle, that a first path of the first smart vehicle and a second path of the second smart vehicle correspond to a conflict between the first smart vehicle and the second smart vehicle. For example, the control circuitry may receive coordinates (e.g., GPS coordinates) from each smart vehicle defining their position, as well as the current speed (e.g., 20 miles per hour) and direction (e.g., north) each smart vehicle is traveling. Alternatively or additionally, the control circuitry may receive the locations, speed, and/or direction of the smart vehicles from sensors configured to detect smart vehicles (e.g., motion sensors near an intersection). The control circuitry may then determine paths of the smart vehicles. For example, based on the location, speed, and direction of each smart vehicle, the control circuitry may determine (e.g., based on kinematic models) the probable locations (i.e., path) at future times for each smart vehicle. The control circuitry may determine that, based on the paths of the two smart vehicles, the two smart vehicles will intersect at a future time. Based on the determination, the control circuitry may determine that the two paths of the two smart vehicles conflict (e.g., one will need to yield to the other).

In some embodiments, the control circuitry determines the conflict between the first smart vehicle and the second smart vehicle based on whether the paths of the two vehicles will intersect within a threshold time. Specifically, the control circuitry may determine the first path of the first smart vehicle based on the first current location and a first velocity of the first smart vehicle. For example, the control circuitry may receive an indication of the velocity (e.g., a speed and direction) and current location of a smart vehicle from a sensor. The control circuitry may use this information to determine the probable next location at a given time for the first smart vehicle. As a specific example, the sensor may be a motion sensor located at an intersection of two roads that determines that a vehicle is approaching an intersection at a particular speed. Alternatively or additionally, the smart vehicle may transmit GPS coordinates or other identifying information of a current location, as well as the current velocity. The control circuitry may determine the second path of the second smart vehicle based on the second current location and a second velocity of the second smart vehicle. For example, as described above for the first smart vehicle, the control circuitry may receive an indication of the velocity (e.g., a speed and direction) and current location of a smart vehicle from a sensor. The control circuitry may use this information to determine the probable next location at a given time for the second smart vehicle. In some embodiments the control circuitry, when determining the path of a smart vehicle, may utilize a kinematic model based on the velocity and location of a smart vehicle. The kinematic model may be adjusted based on probable acceleration rates near and after an intersection, traffic, and other factors that would result in a velocity change of the smart vehicle. Alternatively, the control circuitry may utilize a simple kinetic model utilizing only the velocity and location to determine the path.

The control circuitry may calculate, based on the first path and the second path, a first time that the first smart vehicle and a second time that the second smart vehicle will reach an intersection. For example, based on the determined paths, the control circuitry may determine the location of both smart vehicles at future times. Based on the locations at future times, the control circuitry may determine when each smart vehicle will reach an intersection. As a specific example, if a smart vehicle is approaching an intersection at 20 miles per hour and is 0.2 miles away, the control circuitry may determine that the vehicle will reach the intersection in 0.6 minutes (i.e., 36 seconds), not accounting for acceleration or deceleration of the vehicle. The control circuitry may calculate a difference between the first time and the second time. For example, the control circuitry may determine that the first smart vehicle will reach a particular point in 0.6 seconds and a second smart vehicle will reach the same point in 0.55 seconds. The control circuitry may subtract the two values to obtain a difference of 0.05 seconds. The control circuitry may determine whether the difference is less than a threshold time period. For example, the control circuitry may compare the difference (e.g., 0.05 seconds) to a threshold (e.g., 0.1) to determine whether the two calculated times are close enough to cause a conflict. Specifically, while the two values may not be identical (meaning that the vehicles won't reach the point at exactly the same time), the vehicles may still collide due to error in the calculation (e.g., uncalculated acceleration) or the size of the vehicles. In some embodiments, the control circuitry may select different threshold values based on an indication of the size and/or shape of the smart vehicles.

The control circuitry, in response to determining the conflict, resolves the conflict based on a ratio of the amount of time remaining in media assets being viewed in smart vehicles to the amount of time remaining in trips of the smart vehicles. Specifically, the control circuitry receives a first indication from the first smart vehicle, the first indication including a first duration remaining in a first trip of the first smart vehicle and a second duration remaining in a first media asset being consumed in the first smart vehicle. For example, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle and the amount of time remaining in a media asset being consumed in the smart vehicle. The control circuitry may receive the data in fields of a status table transmitted by a smart vehicle. For example, the status table may contain values (e.g., integers) for the duration remaining in a trip of the smart vehicle and the duration remaining in a media asset being consumed in the smart vehicle. In some embodiments, the status table may contain the current speed, direction, destination coordinates, and/or an indication of whether a media asset is being consumed in the smart vehicle.

In some embodiments, the first indication may be a data packet. Specifically, the control circuitry may receive the data packet from the first smart vehicle. For example, the control circuitry may receive a data packet including parameters associated with the first smart vehicle. The parameters may be stored in fields of a data structure transmitted as part of the data packet. The control circuitry may extract, from the data packet, the first duration remaining in the first trip. For example, the control circuitry may retrieve (e.g., based on a particular index in the data structure for a field associated with the duration remaining in the first trip) a value or values from a field corresponding to the duration remaining in the trip of the smart vehicle, such as integers for the number of hours, minutes, and seconds remaining. The control circuitry may extract, from the data packet, the second duration remaining in the first media asset. Similar to extraction of the first duration, the control circuitry may retrieve a value or values from a field corresponding to the duration remaining in the media asset, such as integers for the number of hours, minutes, and seconds remaining.

The control circuitry calculates a first ratio of the first duration and the second duration as a first factor for the first smart vehicle. For example, the control circuitry may divide the duration of time remaining in the first trip of the smart vehicle by the duration of time remaining in a media asset being consumed in the smart vehicle. As an example, if 20 minutes remain in the trip of the smart vehicle and 40 minutes remain in a media asset being consumed, then the control circuitry may calculate 0.5 as the ratio. The control circuitry may store the ratio as the first factor to use when determining whether the first or second smart vehicle should proceed first (e.g., to resolve the conflict).

In some embodiments, the control circuitry adjusts the first factor based on user preferences stored in a user profile. Specifically, the control circuitry retrieves a user profile associated with the first smart vehicle. For example, the control circuitry may retrieve a user profile associated with the vehicle itself, users associated with the vehicle, or users determined to currently be passengers in the vehicle (e.g., based on data transmitted from the smart vehicle). The control circuitry may then determine, based on a stored user preference in the user profile, an amount to adjust the first factor. For example, the user profile may contain an indication (e.g., a Boolean value set to "false") to turn off media asset viewing progress as a parameter when determining which vehicle proceeds first (e.g., because the user does not like to wait at intersections even when it means a media asset will not be finished before a destination is reached). As another example, the stored user preference could be a different preference for finishing media assets based on the type of media asset. For example, the user may be more amenable to waiting at an intersection so that he or she can finish a movie, but less so to finish a news story. The stored user preferences in the user profile may be associated with particular instructions to adjust the first factor by a given amount. The control circuitry may then adjust the first factor by the amount. For example, the control circuitry may retrieve the current value for the first factor and, based on the amount, generate a new value for the first factor (e.g., adjusted by the amount). The control circuitry may store the new value as the first factor.

In some embodiments, the control circuitry adjusts the first factor based on the content of the media asset. Specifically, the control circuitry may retrieve metadata associated with the first media asset being consumed in the first smart vehicle. For example, the control circuitry may receive an indication of a genre, actor, director, or other metadata associated with the media asset with the transmission from the smart vehicle that includes the amount of time remaining in the media asset and the amount of time remaining in the trip, as described above. Alternatively or additionally, the control circuitry may receive only an identifier of the media asset (e.g., a title) and may access a media guidance data source (e.g., either remote at a server or local in storage) to retrieve metadata associated with the media asset. The control circuitry may determine a type of the first media asset based on the retrieved metadata. A type of media asset may be based on any single attribute of the media asset (e.g., genre, director, and/or actor) or any group that comprises a combination of single attributes (e.g., a group for "chick flicks" may be associated with the genres "romance" and "comedy"). For example, the control circuitry may determine a group to which the media asset belongs based on particular metadata. Specifically, if the control circuitry retrieves metadata for the first media asset such as "Michael Bay" as the director and "action," as the genre, the control circuitry may determine a group that the media asset belongs to based on the metadata, such as "summer blockbusters." The control circuitry may compare the type of the first media asset with a plurality of types stored in a data structure, wherein each stored type is associated with an adjustment instruction. For example, the control circuitry may access a database containing a plurality of entries for different types of media assets. The control circuitry may iteratively compare the type of the first media asset with the types of media assets stored in the database (e.g., by executing a for-loop). The control circuitry may determine that the type corresponds to a first type of the plurality of types stored in the data structure. For example, based on each character of a string of characters for the type of the first media asset (e.g., "drama") matching each character of a string of characters for a type in a particular entry, the control circuitry may determine that the two correspond.

The control circuitry may retrieve a first adjustment instruction associated with the first type. For example, the control circuitry may retrieve, from a field associated with the matched first type in the database, an instruction corresponding to the first type. The instruction may be to increase, decrease, multiple, divide, or perform any other mathematical operation to the first factor by a particular amount. The control circuitry may then adjust the first factor based on the first adjustment instruction. For example, the control circuitry may retrieve the current value for the first factor and, based on the adjustment instruction, generate a new value for the first factor (e.g., adjusted by the adjustment factor). The control circuitry may store the new value as the first factor.

In some embodiments, the control circuitry adjusts the first factor based on whether the playback of the media asset was accelerated. Specifically, the control circuitry may determine that the first media asset has been subject to a playback operation resulting in playback at a greater than normal speed. For example, the control circuitry may determine from a Boolean value set to "true" in a particular field of a table received in a data packet from a smart vehicle that an operation to accelerate the playback of the media asset was performed. The control circuitry, based on determining that the first media asset has been subject to the playback operation, may adjust the first factor by an amount. For example, the control circuitry may increase the first factor by an amount in response to the playback operation being performed (e.g., because the operation indicates that the user is not interested in the media asset and may not want to delay arriving at a destination so that the media asset can finish).

The control circuitry receives a second indication from the second smart vehicle. For example, the control circuitry may receive data from another smart vehicle including status information (e.g., the status table as described above). For example, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle and the amount of time remaining in a media asset being consumed in the smart vehicle.

The control circuitry determines, based on the second indication, whether a second media asset is being consumed in the second smart vehicle. For example, the control circuitry may receive a status table including a Boolean value for whether a user in the second smart vehicle is consuming a media asset. If the Boolean value is set to "true," then the control circuitry may determine that a media asset is also being consumed in the second smart vehicle, and may calculate a second ratio similar to as described above for the first smart vehicle. If the Boolean value is set to "false," then the control circuitry may determine that a media asset is not being consumed by a user in the second smart vehicle.

In some embodiments, if a user in the second smart vehicle also is consuming a media asset, the control circuitry calculates a second ratio compare to the first ratio to determine which smart vehicle should proceed on a respective path first (e.g., to resolve the conflict). Specifically, the control circuitry, in response to determining that the second media asset is being consumed in the second smart vehicle, retrieves, from the second indication, a third duration remaining in a second trip of the second smart vehicle and a fourth duration remaining in a second media asset being consumed in the second smart vehicle. For example, as described above for the first smart vehicle, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle and the amount of time remaining in a media asset being consumed in the smart vehicle. The control circuitry may retrieve the data in fields of a status table transmitted by a smart vehicle as described above. In some embodiments, the duration of time remaining in the media asset and the duration of time remaining in the trip of the second smart vehicle are received in a single transmission from the smart vehicle. In other embodiments, the control circuitry requests the values for the duration of time remaining in the media asset and the duration of time remaining in the trip of the second smart vehicle in response to receiving a first transmission indicating that a user in the second smart vehicle is consuming a media asset.

The control circuitry calculates a second ratio of the third duration and the fourth duration as the second factor for the second smart vehicle. For example, based on the received duration of the second trip of the smart vehicle and the received duration remaining in a media asset being consumed in the second smart vehicle, the control circuitry may calculate a second ratio (e.g., by dividing the two values). As a specific example, if 30 minutes remain in the trip of the smart vehicle and 15 minutes remain in a media asset being consumed, then the control circuitry may calculate 2.0 as the ratio. The control circuitry may store the ratio as the second factor to use when determining whether the first or second smart vehicle should proceed first (e.g., to resolve the conflict).

The control circuitry, in response to determining that the second media asset is not being consumed, assigns a second factor based on a default factor. For example, if the control circuitry determines, based on the Boolean value for whether a media asset is being consumed being "false" for the second smart vehicle, to assign a default value to the second smart vehicle. For example, the default value may be any value that can be compared to the first factor of the first smart vehicle. Specifically, if the first factor is an integer, then the default may also be an integer of any value. The default value may be the same for all smart vehicles, or may be customized based on user preferences, an amount of time remaining in the trip of the second smart vehicle, or other attributes associated with the second smart vehicle.

The control circuitry determines whether the first factor is greater than the second factor. For example, the control circuitry may compare values for the first factor and the second factor to determine which is greater (e.g., by subtracting the two values and determining whether the difference is positive or negative). If the first and second factors are equal, or within a threshold, the control circuitry may determine that a different criterion should be utilized to determine which vehicle proceeds first. For example, the control circuitry may randomly select a vehicle (e.g., based on a random number generator) and instruct that vehicle to proceed first, as described further below.

The control circuitry assigns, based on determining that the first factor is greater than the second factor, a higher priority to the first smart vehicle and a lower priority to the second smart vehicle. If a user in the second smart vehicle was determined to not be consuming a media asset, then the control circuitry compares the default value to the first factor to determine which is greater. If the user in the second smart vehicle was determined to be consuming a media asset, then the control circuitry compares the first and second factors to determine which is greater. Based on which factor is greater, the control circuitry assigns a priority to each vehicle. For example, the priority may be a value ranking the order in which the two vehicles should proceed (e.g., integers "1" and "2").

As a specific example, if a user in the first smart vehicle is consuming a media asset which has more time remaining (e.g., 30 minutes) than the time remaining in the trip (e.g., 15 minutes), then first factor may be less than 1. In this example, if the second smart vehicle is not consuming a media asset and the default value is 1, than the control circuitry determines the second factor (e.g., corresponding to the second vehicle) is greater than the first factor and assigns a higher priority to the second vehicle and a lower priority to the first vehicle. As another example, if a user in the first smart vehicle is consuming a media asset which has less time remaining (e.g., 15 minutes) than the time remaining in the trip (e.g., 45 minutes), then the first factor may be greater than 1. In this example, if the second smart vehicle is not consuming a media asset and the default value is 1, than the control circuitry determines the first factor (e.g., corresponding to the first vehicle) is greater than the second factor and assigns a higher priority to the first vehicle and a lower priority to the second vehicle.

In some embodiments, the control circuitry may assign the default factor (e.g., when no media asset is being viewed in a vehicle) based on comparing an amount of time remaining in a trip of the vehicle with durations in a database. Specifically, the control circuitry may retrieve, from the second indication, a third duration remaining in a second trip of the second smart vehicle. For example, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle, such as an integer or multiple integer values in a field of a data structure. The control circuitry may then compare the third duration to a plurality of durations stored in a data structure, wherein each stored duration is associated with a default value. For example, the control circuitry may access a database, which may be local or remote from the control circuitry, and iteratively retrieve and compare values for times remaining in trips with the third duration received from the vehicle. The control circuitry may scale and/or round the value for the third duration in order to more easily compare with the values in the database (e.g., if each database entry is for 1 minute, the duration may be rounded to the nearest minute). The control circuitry may determine that the third duration matches a stored duration of the plurality of durations. For example, based on comparing the value (e.g., 20 minutes) from a database entry and the received duration (e.g., 20 minutes), the control circuitry may determine a match. The control circuitry may retrieve the default value associated with the stored duration as the default factor. For example, the control circuitry may retrieve a value for the default factor from a field associated with the matched duration. Specifically, if a database entry with a field for a duration of "20 minutes" is matched, then the control circuitry may retrieve, from an associated field, the value for the default factor (e.g., 1.1). Alternatively or additionally, the control circuitry may compare and match other attributes associated with smart vehicles to those stored in a data structure to assign custom tailored default factors. For example, the control circuitry may also assign and/or adjust the default factor based on the brand of the vehicle, user preferences, traffic conditions, traffic rules and regulations, and any other factor used to differentiate vehicles.

In some embodiments, the control circuitry may assign the default factor (e.g., when no media asset is being viewed in a vehicle) based on processing an amount of time remaining in a trip of the vehicle with a mathematical formula. Specifically, the control circuitry may receive, from the second indication, a third duration remaining in a second trip of the second smart vehicle. For example, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle, such as an integer or multiple integer values in a field of a data structure. The control circuitry may input the received duration into a mathematical function. The mathematical function may be continuous, discontinuous, and/or single-valued. For example, the mathematical function may be a linear mapping of durations remaining in a trip to default values. The control circuitry may input a received value for a duration remaining in the trip of a smart vehicle and obtain the default factor as an output.

The control circuitry transmits a first instruction to the first smart vehicle, wherein the first instruction instructs the first smart vehicle to proceed on the first path based on the assigned higher priority. For example, based on the assigned priority for the first smart vehicle being higher than the assigned priority for the second smart vehicle, the control circuitry may transmit a data packet containing an indication (e.g., a string of text such as, "Go") that instructs the first smart vehicle to continue traveling on the first path immediately. As a specific example, the control circuitry may instruct the first smart vehicle to enter an intersection, pass another vehicle, land before another vehicle, etc. based on the higher priority.

The control circuitry transmits a second instruction, wherein the second instruction instructs the second smart vehicle to yield to the first smart vehicle, based on the assigned lower priority, until the first path of the first smart vehicle and the second path of the second smart vehicle no longer correspond to the conflict between the first smart vehicle and the second smart vehicle. For example, based on the assigned lower priority than the first smart vehicle, the control circuitry may transmit a data packet containing an indication to yield (e.g., a string of text such as, "yield") and an identifier of the vehicle to yield to (e.g., an identifier of the first smart vehicle). After the vehicle that the second smart vehicle was instructed to yield to is no longer in the second path of the second smart vehicle, the second smart vehicle may proceed. The control circuitry may monitor (e.g., by using motion sensors) the two smart vehicles and instruct the second smart vehicle when to proceed again, or the second smart vehicle may use embedded sensors and proceed without further transmission to or from the control circuitry.

In some embodiments, the control circuitry transmits the second instruction to the second smart vehicle. For example, if the second smart vehicle subscribes to a service or is able to communicate with the control circuitry performing the systems and methods described above, the second instruction may be transmitted directly to the second smart vehicle. Specifically, the control circuitry may transmit a data packet containing an indication to yield to the first smart vehicle until the first smart vehicle is no longer in the path of the second smart vehicle. The second smart vehicle may interpret (e.g., via a processor) the received instruction from the control circuitry and yield to the first smart vehicle.

In some embodiments, the second smart vehicle may be executing an operating system that is not compatible with the control circuitry, may allow the user to turn off traffic re-routing and guidance from external sources, or be unable to receive a transmission from the control circuitry for any other reason. In this situation, the control circuitry transmits the second instruction to a signaling device that is part of traffic infrastructure. For example, a signaling device may be a traffic light or electronic traffic sign. The signaling device then instructs the second smart vehicle to yield to the first smart vehicle by generating a visual alert to the second smart vehicle. For example, control circuitry may instruct a traffic light to turn on a light bulb that is colored red in the direction that the second smart vehicle desires to travel, indicating that the second smart vehicle should stop. The control circuitry may instruct the traffic light to turn off the red light bulb and turn on a green light bulb after the first smart vehicle is no longer in the path of the second smart vehicle, indicating the second smart vehicle may now proceed.

In some embodiments, the control circuitry confirms that both smart vehicles received the correct instructions. Specifically, the control circuitry receives a first confirmation of the transmitted first instruction from the first smart vehicle. For example, the control circuitry may receive a data packet containing acknowledgement that the first instruction was received and the contents of the first instruction (e.g., that the first smart vehicle received the instruction and that it will now proceed). The control circuitry may receive a second confirmation of the transmitted second instruction from the second smart vehicle. For example, the control circuitry may receive a data packet containing acknowledgement that the second instruction was received and the contents of the second instruction (e.g., that the second smart vehicle received the instruction and that it will yield to the first smart vehicle). The control circuitry may determine, based on the received first confirmation and the received second confirmation, whether the first instruction and the second instruction were properly received. For example, based on comparing the transmitted instructions with the confirmations received from the smart vehicles, the control circuitry may determine whether the correct instructions were received by both vehicles. The control circuitry may, in response to determining that the first instruction and the second instruction were not properly received, re-transmit the first instruction to the first smart vehicle and the second instruction to the second smart vehicle. For example, if both smart vehicles confirm that they will proceed, the control circuitry may determine that one smart vehicle did not receive the correct instruction. In response, the control circuitry may re-transmit the instructions to ensure that the conflict is resolved between the two smart vehicles.

In some embodiments, the control circuitry may generate a high-priority instruction for a smart vehicle based on the duration of time remaining in the media asset and/or the duration of time remaining in the trip. Specifically, the control circuitry stores, based on the first instruction transmitted to the first smart vehicle, a high priority indication associated with the first smart vehicle. For example, the control circuitry may determine that the first factor was not only greater than the second factor, but also larger than a threshold. In response, the control circuitry may store the high-priority indication (e.g., a Boolean value set to "true" that is associated with the first smart vehicle). Alternatively or additionally, the control circuitry may store the high-priority indication for the first smart vehicle if the duration remaining in a trip of the first smart vehicle is very long (e.g., past a threshold) where a passenger may become annoyed stopping often at intersections for the control circuitry to determine which smart vehicle goes first.

To allow the first smart vehicle to pass through future intersections without performing the comparison steps described above, the control circuitry may transmit an indication to other servers at other intersections along the route that the first smart vehicle will travel. Specifically, the control circuitry transmits the high priority indication associated with the first smart vehicle to a server monitoring an intersection after the first conflict in the first trip of the first smart vehicle. For example, the control circuitry may monitor only a portion (e.g., five miles) of the route that the first smart vehicle will travel to reach its destination (e.g., which may be fifty miles away). In this situation, the control circuitry of one server may transmit the high priority indication to a server or servers that are responsible for resolving conflicts between smart vehicles along the route the first smart vehicle will take.

The control circuitry may determine that a third path of the first smart vehicle corresponds to a second conflict with a fourth path of a third smart vehicle at the intersection. For example, the control circuitry (e.g., of another server at another point along the route of the first smart vehicle that received the high priority indication) may determine that the path of the first smart vehicle corresponds to another conflict, this time with a fourth path of a third smart vehicle, similar to as described above for determining the first conflict. The control circuitry may be located at an intersection or other point along the route of the first smart vehicle after the point where the first conflict was determined. The control circuitry may transmit, based on the high priority indication, a third instruction to the first smart vehicle, wherein the third instruction instructs the first smart vehicle to proceed on the third path. The control circuitry may also transmit, based on the high priority indication, a fourth instruction to the third smart vehicle, wherein the fourth instruction instructs the third smart vehicle to yield to the first smart vehicle until the third path of the first smart vehicle and the fourth path of the third smart vehicle no longer correspond to the second conflict. For example, instead of performing the calculation steps described above for resolving the first conflict, the control circuitry may resolve the second conflict by automatically instructing the first smart vehicle to proceed and the third smart vehicle to yield, based on the high priority indication.

The described systems and methods can resolve a conflict between smart vehicles based on the playback points of media assets being viewed in the smart vehicles. Conventional systems may resolve conflicts between smart vehicles based on traffic rules and/or the trajectory of the vehicles. However, this process neglects actions performed by the user inside the vehicle (e.g., viewing a media asset). Particularly, conventional systems do not factor into the determination of which vehicle goes first, after a conflict is determined, whether a user will be able to finish a media asset before a trip ends (and whether they desire to based on user preferences). The described systems and methods, by accounting for media asset viewing in smart vehicles when determining which vehicle goes first, maximize a user's enjoyment of media assets by minimizing interruptions to media asset playback (e.g., a user reaching a destination before the media asset is over might require the user to switch to viewing on another device).

It should be noted the systems and/or methods described above may be applied to, or used in accordance with, other systems, methods and/or apparatuses described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for resolving conflicts between paths of smart vehicles based on time remaining in media assets being consumed in the smart vehicles. For example, two smart vehicles may be traveling along routes that conflict (e.g., they will converge at a particular point in the routes and collide). In order to resolve the conflict, one vehicle is instructed to yield to the other vehicle until the path is clear. The vehicles are instructed based on whether one or both vehicles are displaying a media asset (e.g., a movie) to passengers, and the amount of time left in the media asset compared to the amount of time left until the vehicles reach their destinations. In this way, the systems and methods may maximize a user's enjoyment of media assets by minimizing interruptions to media asset playback (e.g., a user reaching a destination before the media asset is over might require the user to switch to viewing on another device) by varying the length of their trip in an unobtrusive way (e.g., only when a conflict with another vehicle is determined).

The systems and methods described may be performed by control circuitry. In some embodiments, the control circuitry may be implemented at a central facility. For example, the control circuitry may be located in a server that determines and resolves conflicts for a plurality of smart vehicles. In some embodiments, the control circuitry may be implemented in a local node that communicates via a communication network with other nodes at other locations and/or a central control server (e.g., a distributed systems approach). In some embodiments, the control circuitry may be implemented in smart vehicles themselves. For example, two smart vehicles may determine a conflict between one another and communicate with one another to determine which vehicle should proceed first consistent with the above systems and methods. In other embodiments, the control circuitry may be configured to execute a media guidance application, which may perform the described systems and methods. Alternatively or additionally, the control circuitry may be implemented in any other suitable device configured to communicate with smart vehicles.

Figure 1:
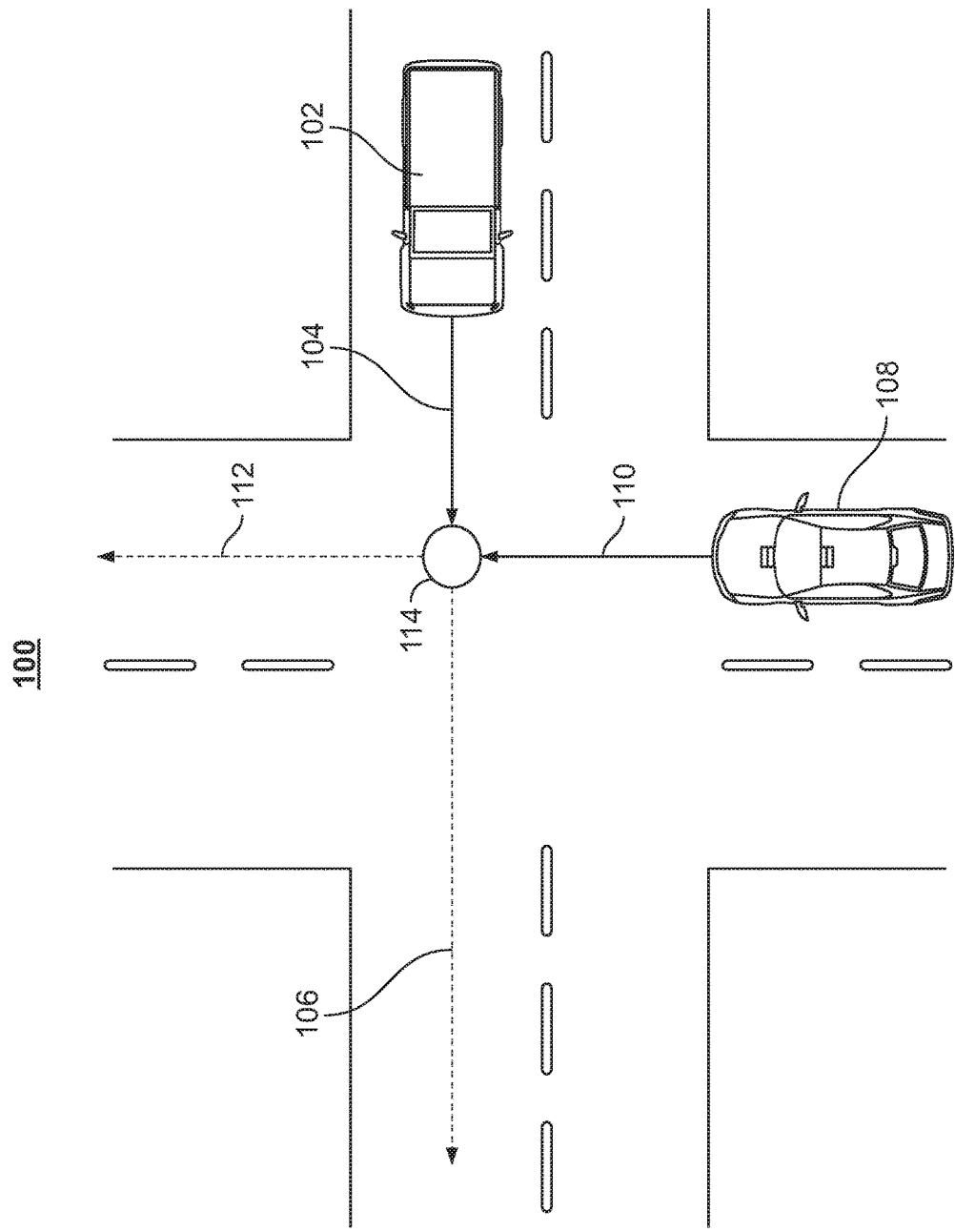
FIG. 1 shows an illustrative example of a conflict between two smart vehicles, in accordance with some embodiments of the disclosure.

FIG. 1 shows an illustrative example of a conflict between two smart vehicles, in accordance with some embodiments of the disclosure. For example, smart vehicles 102 and 108 may be approaching traffic intersection 100. Specifically, smart vehicle 102 is traveling along path 106 and smart vehicle 108 is traveling along path 112. Based on the current location, path, and speed of both smart vehicle 102 and 108, conflict 114 is determined between smart vehicles 102 and 108. Specifically, smart vehicle 102 may travel portion 104 of path 106 in the same amount of time as smart vehicle 108 travels portion 110 of path 112.

In some embodiments, the control circuitry determines, based on a first current location of a first smart vehicle and a second current location of a second smart vehicle, that a first path of the first smart vehicle and a second path of the second smart vehicle correspond to a conflict between the first smart vehicle and the second smart vehicle. For example, the control circuitry may receive coordinates (e.g., GPS coordinates) from each smart vehicle (e.g., smart vehicles 102 and 108) defining their position, as well as the current velocity each smart vehicle is traveling. As referred to herein, "velocity" should be understood as a speed in a given direction. For example, a smart vehicle's velocity may be 20 miles per hour along a given path (e.g., path 106). Alternatively or additionally, the control circuitry may receive the locations and velocities of the smart vehicles from sensors configured to detect smart vehicles (e.g., motion sensors near intersection 100).

As referred to herein, a "smart vehicle" should be understood as any mode of transportation where operation of the mode of transportation is at least partially automated. For example, the mode of transportation may be a train, plane, automobile, motorcycle, boat, or any other transportation mode capable of transporting a passenger to a destination. In some embodiments, the operation of the mode of transportation may be partially automated. For example, the smart vehicle may have lane following that allows the driver to relax when on an empty highway, but the driver still manually operates the smart vehicle in heavy traffic congestion. In other embodiments, the operation of the mode of transportation may be fully automated. For example, a passenger may input a destination to a smart vehicle, which then proceeds to the destination without any further input or operation from the passenger.

The control circuitry may then determine paths of the smart vehicles. For example, based on the location, speed, and direction of each smart vehicle (e.g., smart vehicles 102 and 108), the control circuitry may determine (e.g., based on kinematic models) the probable locations (i.e., locations along paths 106 and 112) at future times for each smart vehicle. As referred to herein, a path of a smart vehicle should be understood as probable locations of the smart vehicle at particular times. As an example, the control circuitry may determine a path (e.g., path 106 or 112) by using kinematic models. For example, neglecting acceleration, the control circuitry may calculate a path using the equation $x(t)=x_0+v_0 t$, where $x(t)$ is the location of a smart vehicle at a given time, $x_0$ is the initial position of the smart vehicle, $v_0$ is the initial velocity of the smart vehicle, and $t$ is time. The control circuitry may utilize additional variables and terms in a kinematic model to determine the path of a smart vehicle (e.g., acceleration) for a potentially more accurate determination of a path. For example, the control circuitry may factor in the traffic conditions, preferences from a user profile (e.g., for the smart vehicle to travel below a certain speed), weather conditions, and/or any other parameter that may affect the rate at which smart vehicles travel. The control circuitry may determine that, based on the paths of the two smart vehicles, the two smart vehicles will intersect at a future time. Based on the determination, the control circuitry may determine that the two paths of the two smart vehicles conflict (e.g., one will need to yield to the other). For example, after a given period of time, two smart vehicles (e.g., smart vehicles 102 or 108) may reach the same area (e.g., smart vehicle 102 travels portion 104 in the same amount of time as smart vehicle 108 travels portion 110, leading to conflict 114).

In some embodiments, the control circuitry determines the conflict between the first smart vehicle and the second smart vehicle based on whether the paths of the two vehicles will intersect within a threshold time. Specifically, the control circuitry may determine the first path (e.g., path 106) of the first smart vehicle (e.g., smart vehicle 102) based on the first current location and a first velocity of the first smart vehicle. For example, the control circuitry may receive an indication of the velocity (e.g., a speed and direction) and current location of a smart vehicle from a sensor (e.g., a motion sensor at intersection 100). The control circuitry may use this information to determine the probable next location at a given time for the first smart vehicle, as discussed above. As a specific example, the sensor may be a motion sensor located at an intersection of two roads that determines that a vehicle is approaching an intersection at a particular speed. Alternatively or additionally, the smart vehicle may transmit GPS coordinates or other identifying information of a current location, as well as the current velocity. The control circuitry may determine the second path of the second smart vehicle based on the second current location and a second velocity of the second smart vehicle. For example, as described above for the first smart vehicle, the control circuitry may receive an indication of the velocity (e.g., a speed and direction) and current location of a smart vehicle (e.g., smart vehicle 108) from a sensor. The control circuitry may use this information to determine the probable next location at a given time for the second smart vehicle (e.g., path 112). In some embodiments the control circuitry, when determining the path of a smart vehicle, may utilize a kinematic model based on the velocity and location of a smart vehicle, as described further above. The kinematic model may be adjusted based on probable acceleration rates near and after an intersection, traffic, and other factors that would result in a velocity change of the smart vehicle. Alternatively, the control circuitry may utilize a simple kinetic model utilizing only the velocity and location to determine the path.

The control circuitry may calculate, based on the first path and the second path, a first time that the first smart vehicle and a second time that the second smart vehicle will reach an intersection. For example, based on the determined paths (e.g., paths 106 and 112), the control circuitry may determine the location of both smart vehicles at future times. Based on the locations at future times (e.g., portion 104 and 110), the control circuitry may determine when each smart vehicle (e.g., smart vehicles 102 and 108) will reach an intersection (e.g., intersection 100). As a specific example, if a smart vehicle is approaching an intersection at 20 miles per hour and is 0.2 miles away, the control circuitry may determine that the vehicle will reach the intersection in 0.6 minutes (i.e., 36 seconds), not accounting for acceleration or deceleration of the vehicle. The control circuitry may calculate a difference between the first time and the second time. For example, the control circuitry may determine that the first smart vehicle will reach a particular point in 0.6 seconds and a second smart vehicle will reach the same point in 0.55 seconds. The control circuitry may subtract the two values to obtain a difference of 0.05 seconds. The control circuitry may determine whether the difference is less than a threshold time period. For example, the control circuitry may compare the difference (e.g., 0.05 seconds) to a threshold (e.g., 0.1) to determine whether the two calculated times are close enough to cause a conflict (e.g., conflict 114). Specifically, while the two values may not be identical (meaning that the vehicles won't reach the point at exactly the same time), the vehicles may still collide due to error in the calculation (e.g., uncalculated acceleration) or the size of the vehicles. In some embodiments, the control circuitry may select different threshold values based on an indication of the size and/or shape of the smart vehicles.

The control circuitry, in response to determining the conflict, resolves the conflict based on a ratio of the amount of time remaining in media assets being viewed in smart vehicles to the amount of time remaining in trips of the smart vehicles. Specifically, the control circuitry receives a first indication from the first smart vehicle (e.g., smart vehicle 102), the first indication including a first duration remaining in a first trip of the first smart vehicle and a second duration remaining in a first media asset being consumed in the first smart vehicle. For example, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle and the amount of time remaining in a media asset being consumed in the smart vehicle. The control circuitry may receive the data in fields of a status table transmitted by a smart vehicle. For example, the status table may contain values (e.g., integers) for the duration remaining in a trip of the smart vehicle and the duration remaining in a media asset being consumed in the smart vehicle. In some embodiments, the status table may contain the current speed, direction, destination coordinates, and/or an indication of whether a media asset is being consumed in the smart vehicle.

In some embodiments, the first indication may be a data packet. Specifically, the control circuitry may receive the data packet from the first smart vehicle (e.g., smart vehicle 102). For example, the control circuitry may receive a data packet including parameters associated with the first smart vehicle. The parameters may be stored in fields of a data structure transmitted as part of the data packet. The control circuitry may extract, from the data packet, the first duration remaining in the first trip. For example, the control circuitry may retrieve (e.g., based on a particular index in the data structure for a field associated with the duration remaining in the first trip) a value or values from a field corresponding to the duration remaining in the trip of the smart vehicle, such as integers for the number of hours, minutes, and seconds remaining. The control circuitry may extract, from the data packet, the second duration remaining in the first media asset. Similar to extraction of the first duration, the control circuitry may retrieve a value or values from a field corresponding to the duration remaining in the media asset, such as integers for the number of hours, minutes, and seconds remaining.

The control circuitry calculates a first ratio of the first duration and the second duration as a first factor for the first smart vehicle. For example, the control circuitry may divide the duration of time remaining in the first trip of the smart vehicle (e.g., smart vehicle 102) by the duration of time remaining in a media asset being consumed in the smart vehicle. As an example, if 20 minutes remain in the trip of the smart vehicle and 40 minutes remain in a media asset being consumed, then the control circuitry may calculate 0.5 as the ratio. Control circuitry may store the ratio as the first factor to use when determining whether the first or second smart vehicle (e.g., smart vehicle 108) should proceed first (e.g., to resolve the conflict).

In some embodiments, the control circuitry adjusts the first factor based on user preferences stored in a user profile. Specifically, the control circuitry may retrieve a user profile associated with the first smart vehicle. For example, the control circuitry may retrieve a user profile associated with the vehicle itself (e.g., with one of smart vehicles 102 and 108), users associated with the vehicle, or users determined to currently be passengers in the vehicle (e.g., based on data transmitted from the smart vehicle). The control circuitry may then determine, based on a stored user preference in the user profile, an amount to adjust the first factor. For example, the user profile may contain an indication (e.g., a Boolean value set to "false") to turn off media asset viewing progress as a parameter when determining which vehicle proceeds first (e.g., because the user does not like to wait at intersections even when it means a media asset will not be finished before a destination is reached). As another example, the stored user preference could be a different preference for finishing media assets based on the type of media asset. For example, the user may be more amenable to waiting at an intersection (e.g., intersection 100) so that he or she can finish a movie, but less so to finish a news story. The stored user preferences in the user profile may be associated with particular instructions to adjust the first factor by a given amount. The control circuitry may then adjust the first factor by the amount. For example, the control circuitry may retrieve the current value for the first factor and, based on the amount, generate a new value for the first factor (e.g., adjusted by the amount). The control circuitry may store the new value as the first factor.

In some embodiments, the control circuitry adjusts the first factor based on the content of the media asset. Specifically, the control circuitry may retrieve metadata associated with the first media asset being consumed in the first smart vehicle (e.g., one of smart vehicles 102 and 108). For example, the control circuitry may receive an indication of a genre, actor, director, or other metadata associated with the media asset with the transmission from the smart vehicle that includes the amount of time remaining in the media asset and the amount of time remaining in the trip, as described above. Alternatively or additionally, the control circuitry may receive only an identifier of the media asset (e.g., a title) and may access a media guidance data source (e.g., either remote at a server or local in storage) to retrieve metadata associated with the media asset. The control circuitry may determine a type of the first media asset based on the retrieved metadata. A type of media asset may be based on any single attribute of the media asset (e.g., genre, director, and/or actor) or any group that comprises a combination of single attributes (e.g., a group for "chick flicks" may be associated with the genres "romance" and "comedy"). For example, the control circuitry may determine a group to which the media asset belongs based on particular metadata. Specifically, if the control circuitry retrieves metadata for the first media asset such as "Michael Bay" as the director and "action," as the genre, the control circuitry may determine a group that the media asset belongs to based on the metadata, such as "summer blockbusters." The control circuitry may compare the type of the first media asset with a plurality of types stored in a data structure, wherein each stored type is associated with an adjustment instruction. For example, the control circuitry may access a database containing a plurality of entries for different types of media assets. The control circuitry may iteratively compare the type of the first media asset with the types of media assets stored in the database (e.g., by executing a for-loop). The control circuitry may determine that the type corresponds to a first type of the plurality of types stored in the data structure. For example, based on each character of a string of characters for the type of the first media asset (e.g., "drama") matching each character of a string of characters for a type in a particular entry, the control circuitry may determine that the two correspond.

The control circuitry may retrieve a first adjustment instruction associated with the first type. For example, the control circuitry may retrieve, from a field associated with the matched first type in the database, an instruction corresponding to the first type. The instruction may be to increase, decrease, multiple, divide, or perform any other mathematical operation to the first factor by a particular amount. The control circuitry may then adjust the first factor based on the first adjustment instruction. For example, the control circuitry may retrieve the current value for the first factor and, based on the adjustment instruction, generate a new value for the first factor (e.g., adjusted by the adjustment factor). The control circuitry may store the new value as the first factor.

In some embodiments, the control circuitry adjusts the first factor based on whether the playback of the media asset was accelerated. Specifically, the control circuitry may determine that the first media asset has been subject to a playback operation resulting in playback at a greater than normal speed. For example, the control circuitry may determine from a Boolean value set to "true" in a particular field of a table received in a data packet from a smart vehicle that an operation to accelerate the playback of the media asset was performed. The control circuitry, based on determining that the first media asset has been subject to the playback operation, may adjust the first factor by an amount. For example, the control circuitry may increase the first factor by an amount in response to the playback operation being performed (e.g., because the operation indicates that the user is not interested in the media asset and may not want to delay arriving at a destination so that the media asset can finish).

The control circuitry receives a second indication from the second smart vehicle. For example, the control circuitry may receive data from another smart vehicle (e.g., smart vehicle 108) including status information (e.g., the status table as described above). For example, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle and the amount of time remaining in a media asset being consumed in the smart vehicle.

The control circuitry determines, based on the second indication, whether a second media asset is being consumed in the second smart vehicle. For example, the control circuitry may receive a status table including a Boolean value for whether a user in the second smart vehicle (e.g., smart vehicle 108) is consuming a media asset. If the Boolean value is set to "true," then the control circuitry may determine that a media asset is also being consumed in the second smart vehicle, and may calculate a second ratio similar to as described above for the first smart vehicle. If the Boolean value is set to "false," then the control circuitry may determine that a media asset is not being consumed by a user in the second smart vehicle.

In some embodiments, if a user in the second smart vehicle also is consuming a media asset, the control circuitry calculates a second ratio compare to the first ratio to determine which smart vehicle should proceed on a respective path first (e.g., to resolve the conflict). Specifically, the control circuitry, in response to determining that the second media asset is being consumed in the second smart vehicle, retrieves, from the second indication, a third duration remaining in a second trip of the second smart vehicle and a fourth duration remaining in a second media asset being consumed in the second smart vehicle. For example, as described above for the first smart vehicle (e.g., smart vehicles 102), the control circuitry may receive data from a smart vehicle (e.g., smart vehicle 108) corresponding to the duration remaining in a trip of the smart vehicle and the amount of time remaining in a media asset being consumed in the smart vehicle. The control circuitry may retrieve the data in fields of a status table transmitted by a smart vehicle as described above. In some embodiments, the duration of time remaining in the media asset and the duration of time remaining in the trip of the second smart vehicle are received in a single transmission from the smart vehicle. In other embodiments, the control circuitry requests the values for the duration of time remaining in the media asset and the duration of time remaining in the trip of the second smart vehicle in response to receiving a first transmission indicating that a user in the second smart vehicle is consuming a media asset.

The control circuitry calculates a second ratio of the third duration and the fourth duration as the second factor for the second smart vehicle. For example, based on the received duration of the second trip of the smart vehicle (e.g., smart vehicle 108) and the received duration remaining in a media asset being consumed in the second smart vehicle, the control circuitry may calculate a second ratio (e.g., by dividing the two values). As a specific example, if 30 minutes remain in the trip of the smart vehicle and 15 minutes remain in a media asset being consumed, then the control circuitry may calculate 2.0 as the ratio. The control circuitry may store the ratio as the second factor to use when determining whether the first or second smart vehicle should proceed first (e.g., to resolve the conflict).

The control circuitry, in response to determining that the second media asset is not being consumed, assigns a second factor based on a default factor. For example, if the control circuitry determines, based on the Boolean value for whether a media asset is being consumed being "false" for the second smart vehicle, to assign a default value to the second smart vehicle. For example, the default value may be any value that can be compared to the first factor of the first smart vehicle (e.g., smart vehicle 102). Specifically, if the first factor is an integer, then the default may also be an integer of any value. The default value may be the same for all smart vehicles, or may be customized based on user preferences, an amount of time remaining in the trip of the second smart vehicle (e.g., smart vehicle 108), or other attributes associated with the second smart vehicle.

The control circuitry determines whether the first factor is greater than the second factor. For example, the control circuitry may compare values for the first factor and the second factor to determine which is greater (e.g., by subtracting the two values and determining whether the difference is positive or negative). If the first and second factors are equal, or within a threshold, the control circuitry may determine that a different criterion should be utilized to determine which vehicle proceeds first. For example, the control circuitry may randomly select a vehicle (e.g., based on a random number generator) and instruct that vehicle (e.g., one of smart vehicles 102 or 108) to proceed first, as described further below.

The control circuitry assigns, based on determining that the first factor is greater than the second factor, a higher priority to the first smart vehicle and a lower priority to the second smart vehicle. If a user in the second smart vehicle (e.g., smart vehicle 108) was determined to not be consuming a media asset, then the control circuitry compares the default value to the first factor to determine which is greater. If the user in the second smart vehicle was determined to be consuming a media asset, then the control circuitry compares the first and second factors to determine which is greater. Based on which factor is greater, the control circuitry assigns a priority to each vehicle (e.g., to smart vehicles 102 and 108). For example, the priority may be a value ranking the order in which the two vehicles should proceed (e.g., integers "1" and "2").

As a specific example, if a user in the first smart vehicle (e.g., smart vehicle 102) is consuming a media asset which has more time remaining (e.g., 30 minutes) than the time remaining in the trip (e.g., 15 minutes), then first factor may be less than 1. In this example, if the second smart vehicle (e.g., smart vehicle 108) is not consuming a media asset and the default value is 1, than the control circuitry determines the second factor (e.g., corresponding to the second vehicle) is greater than the first factor and assigns a higher priority to the second vehicle and a lower priority to the first vehicle. As another example, if a user in the first smart vehicle is consuming a media asset which has less time remaining (e.g., 15 minutes) than the time remaining in the trip (e.g., 45 minutes), then the first factor may be greater than 1. In this example, if the second smart vehicle is not consuming a media asset and the default value is 1, than the control circuitry determines the first factor (e.g., corresponding to the first vehicle) is greater than the second factor and assigns a higher priority to the first vehicle and a lower priority to the second vehicle.

In some embodiments, the control circuitry may assign the default factor (e.g., when no media asset is being viewed in a vehicle) based on comparing an amount of time remaining in a trip of the vehicle with durations in a database. Specifically, the control circuitry may retrieve, from the second indication, a third duration remaining in a second trip of the second smart vehicle. For example, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle (e.g., smart vehicle 102 or 108), such as an integer or multiple integer values in a field of a data structure. The control circuitry may then compare the third duration to a plurality of durations stored in a data structure, where each stored duration is associated with a default value. For example, the control circuitry may access a database, which may be local or remote from the control circuitry, and iteratively retrieve and compare values for times remaining in trips with the third duration received from the vehicle. The control circuitry may scale and/or round the value for the third duration in order to more easily compare with the values in the database (e.g., if each database entry is for 1 minute, the duration may be rounded to the nearest minute). The control circuitry may determine that the third duration matches a stored duration of the plurality of durations. For example, based on comparing the value (e.g., 20 minutes) from a database entry and the received duration (e.g., 20 minutes), the control circuitry may determine a match. The control circuitry may retrieve the default value associated with the stored duration as the default factor. For example, the control circuitry may retrieve a value for the default factor from a field associated with the matched duration. Specifically, if a database entry with a field for a duration of "20 minutes" is matched, then the control circuitry may retrieve, from an associated field, the value for the default factor (e.g., 1.1). Alternatively or additionally, the control circuitry may compare and match other attributes associated with smart vehicles to those stored in a data structure to assign custom tailored default factors. For example, the control circuitry may also assign and/or adjust the default factor based on the brand of the vehicle, user preferences, traffic conditions, traffic rules and regulations, and any other factor used to differentiate vehicles.

In some embodiments, the control circuitry may assign the default factor (e.g., when no media asset is being viewed in a vehicle) based on processing an amount of time remaining in a trip of the vehicle with a mathematical formula. Specifically, the control circuitry may receive, from the second indication, a third duration remaining in a second trip of the second smart vehicle (e.g., smart vehicle 108). For example, the control circuitry may receive data from a smart vehicle (e.g., transmitted via Bluetooth or other near-field communication protocol, LTE or other broadband communication protocol, or any other suitable communication protocol) corresponding to the duration remaining in a trip of the smart vehicle, such as an integer or multiple integer values in a field of a data structure. The control circuitry may input the received duration into a mathematical function. The mathematical function may be continuous, discontinuous, and/or single-valued. For example, the mathematical function may be a linear mapping of durations remaining in a trip to default values. The control circuitry may input a received value for a duration remaining in the trip of a smart vehicle and obtain the default factor as an output of the mathematical function.

The control circuitry transmits a first instruction to the first smart vehicle, wherein the first instruction instructs the first smart vehicle to proceed on the first path based on the assigned higher priority. For example, based on the assigned priority for the first smart vehicle (e.g., smart vehicle 102) being higher than the assigned priority for the second smart vehicle (e.g., smart vehicle 108), the control circuitry may transmit a data packet containing an indication (e.g., a string of text such as, "Go") that instructs the first smart vehicle to continue traveling on the first path immediately. As a specific example, the control circuitry may instruct the first smart vehicle to enter an intersection, pass another vehicle, land before another vehicle, etc. based on the higher priority.

The control circuitry transmits a second instruction, wherein the second instruction instructs the second smart vehicle to yield to the first smart vehicle, based on the assigned lower priority, until the first path of the first smart vehicle and the second path of the second smart vehicle no longer correspond to the conflict between the first smart vehicle and the second smart vehicle. For example, based on the assigned lower priority than the first smart vehicle (e.g., smart vehicle 102), the control circuitry may transmit a data packet containing an indication to yield (e.g., a string of text such as, "yield") and an identifier of the vehicle to yield to (e.g., an identifier of the first smart vehicle) to the second smart vehicle (e.g., smart vehicle 108). After the vehicle that the second smart vehicle was instructed to yield to is no longer in the second path (e.g., path 112) of the second smart vehicle, the second smart vehicle may proceed. The control circuitry may monitor (e.g., by using motion sensors) the two smart vehicles and instruct the second smart vehicle when to proceed again, or the second smart vehicle may use embedded sensors and proceed without further transmission to or from the control circuitry.

In some embodiments, the control circuitry transmits the second instruction to the second smart vehicle. For example, if the second smart vehicle (e.g., smart vehicle 108) subscribes to a service or is able to communicate with the control circuitry performing the systems and methods described above, the second instruction may be transmitted directly to the second smart vehicle. Specifically, the control circuitry may transmit a data packet containing an indication to yield to the first smart vehicle until the first smart vehicle (e.g., smart vehicle 102) is no longer in the path (e.g., path 112) of the second smart vehicle. The second smart vehicle may interpret (e.g., via a processor) the received instruction from the control circuitry and yield to the first smart vehicle.

In some embodiments, the second smart vehicle (e.g., smart vehicle 108) may be executing an operating system that is not compatible with the control circuitry, may allow the user to turn off traffic re-routing and guidance from external sources, or be unable to receive a transmission from the control circuitry for any other reason. In this situation, the control circuitry transmits the second instruction to a signaling device that is part of traffic infrastructure. For example, a signaling device may be a traffic light or electronic traffic sign. The signaling device then instructs the second smart vehicle to yield to the first smart vehicle (e.g., smart vehicle 102) by generating a visual alert to the second smart vehicle. For example, control circuitry may instruct a traffic light to turn on a light bulb that is colored red in the direction that the second smart vehicle desires to travel (e.g., path 112), indicating that the second smart vehicle should stop. The control circuitry may instruct the traffic light to turn off the red light bulb and turn on a green light bulb after the first smart vehicle is no longer in the path of the second smart vehicle, indicating the second smart vehicle may now proceed.

In some embodiments, the control circuitry confirms that both smart vehicles received the correct instructions. Specifically, the control circuitry receives a first confirmation of the transmitted first instruction from the first smart vehicle. For example, the control circuitry may receive a data packet containing acknowledgement that the first instruction was received and the contents of the first instruction (e.g., that the first smart vehicle received the instruction and that it will now proceed). The control circuitry may receive a second confirmation of the transmitted second instruction from the second smart vehicle. For example, the control circuitry may receive a data packet containing acknowledgement that the second instruction was received and the contents of the second instruction (e.g., that the second smart vehicle received the instruction and that it will yield to the first smart vehicle). The control circuitry may determine, based on the received first confirmation and the received second confirmation, whether the first instruction and the second instruction were properly received. For example, based on comparing the transmitted instructions with the confirmations received from the smart vehicles (e.g., smart vehicles 102 and 108), the control circuitry may determine whether the correct instructions were received by both vehicles. The control circuitry may, in response to determining that the first instruction and the second instruction were not properly received, re-transmit the first instruction to the first smart vehicle and the second instruction to the second smart vehicle. For example, if both smart vehicles confirm that they will proceed, the control circuitry may determine that one smart vehicle did not receive the correct instruction. In response, the control circuitry may re-transmit the instructions to ensure that the conflict is resolved between the two smart vehicles.

In some embodiments, the control circuitry may generate a high-priority instruction for a smart vehicle based on the duration of time remaining in the media asset and/or the duration of time remaining in the trip. Specifically, the control circuitry stores, based on the first instruction transmitted to the first smart vehicle, a high priority indication associated with the first smart vehicle. For example, the control circuitry may determine that the first factor was not only greater than the second factor, but also larger than a threshold. In response, the control circuitry may store the high-priority indication (e.g., a Boolean value set to "true" that is associated with the first smart vehicle). Alternatively or additionally, the control circuitry may store the high-priority indication for the first smart vehicle (e.g., smart vehicle 102) if the duration remaining in a trip of the first smart vehicle is very long (e.g., past a threshold) where a passenger may become annoyed stopping often at intersections for the control circuitry to determine which smart vehicle goes first.

To allow the first smart vehicle to pass through future intersections without performing the comparison steps described above, the control circuitry may transmit an indication to other servers at other intersections along the route that the first smart vehicle will travel. Specifically, the control circuitry transmits the high priority indication associated with the first smart vehicle to a server monitoring an intersection after the first conflict (e.g., conflict 114) in the first trip of the first smart vehicle. For example, the control circuitry may monitor only a portion (e.g., five miles) of the route that the first smart vehicle will travel to reach its destination (e.g., which may be fifty miles away). In this situation, the control circuitry of one server may transmit the high priority indication to a server or servers that are responsible for resolving conflicts between smart vehicles along the route the first smart vehicle will take.

The control circuitry may determine that a third path of the first smart vehicle corresponds to a second conflict with a fourth path of a third smart vehicle at the intersection. For example, the control circuitry (e.g., of another server at another point along the route of the first smart vehicle that received the high priority indication) may determine that the path of the first smart vehicle (e.g., smart vehicle 102) corresponds to another conflict, this time with a fourth path of a third smart vehicle, similar to as described above for determining the first conflict. The control circuitry may be located at an intersection or other point along the route of the first smart vehicle after the point where the first conflict was determined. The control circuitry may transmit, based on the high priority indication, a third instruction to the first smart vehicle, wherein the third instruction instructs the first smart vehicle to proceed on the third path. The control circuitry may also transmit, based on the high priority indication, a fourth instruction to the third smart vehicle, wherein the fourth instruction instructs the third smart vehicle to yield to the first smart vehicle until the third path of the first smart vehicle and the fourth path of the third smart vehicle no longer correspond to the second conflict. For example, instead of performing the calculation steps described above for resolving the first conflict, the control circuitry may resolve the second conflict by automatically instructing the first smart vehicle to proceed and the third smart vehicle to yield, based on the high priority indication.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
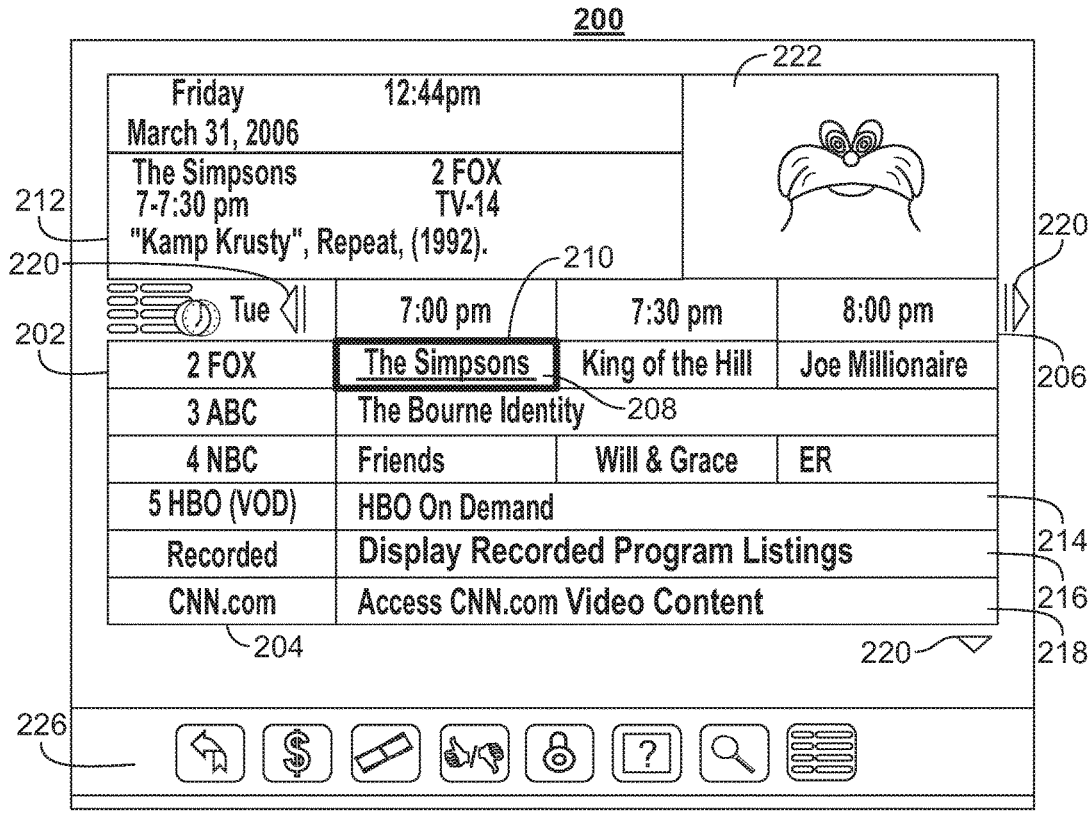
FIG. 2 shows an illustrative example of a display screen for use in accessing media content in accordance with some embodiments of the disclosure.
Figure 3:
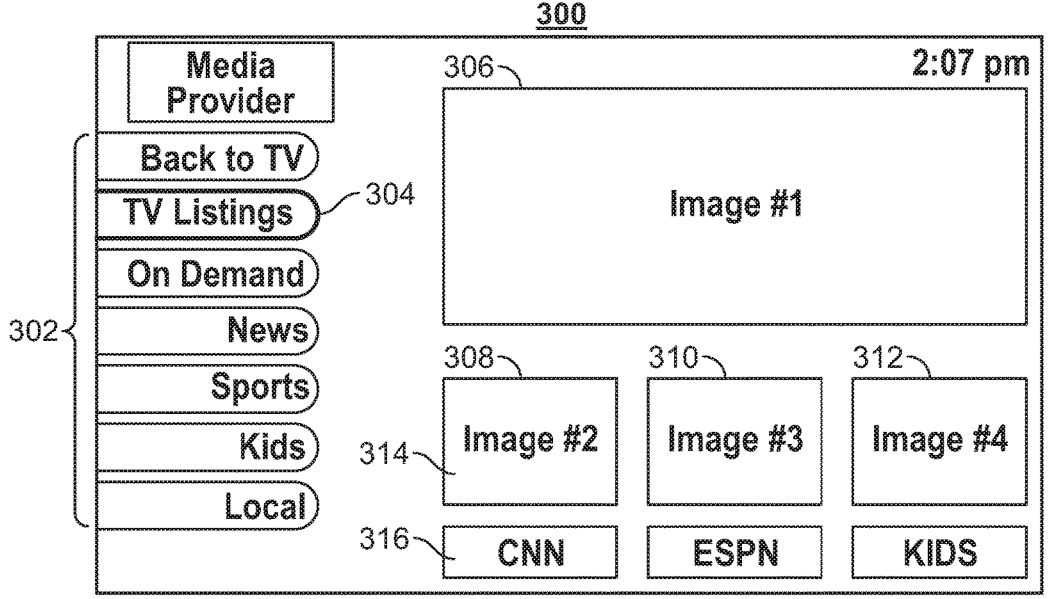
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 4:
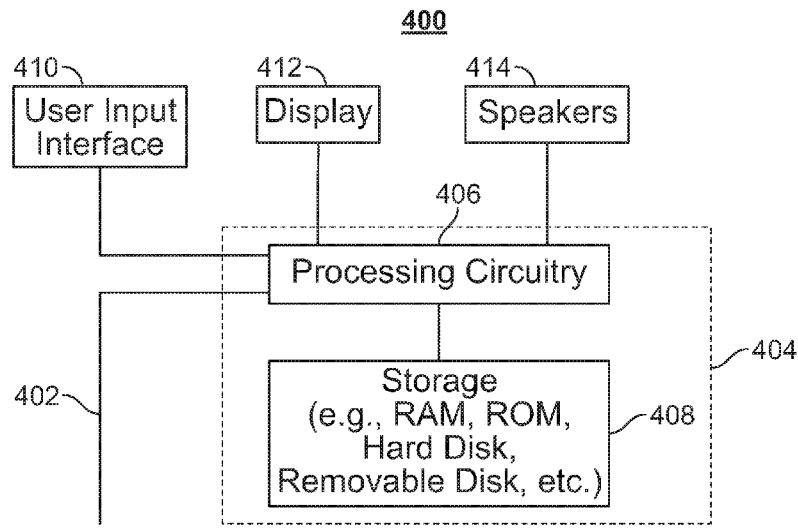
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

In some embodiments, control circuitry 404 may be implemented at a central facility. For example, control circuitry 404 may be located in a server that determines and resolves conflicts for a plurality of smart vehicles. In some embodiments, control circuitry 404 may be implemented in a local node that communicates via a communication network with other nodes at other locations and/or a central control server (e.g., a distributed systems approach). In some embodiments, control circuitry 404 may be implemented in smart vehicles themselves. For example, two smart vehicles may determine a conflict between one another and communicate with one another to determine which vehicle should proceed first consistent with the above systems and methods. In other embodiments, control circuitry 404 may be configured to execute a media guidance application, which may perform the described systems and methods. Alternatively or additionally, control circuitry 404 may be implemented in any other suitable device configured to communicate with smart vehicles.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
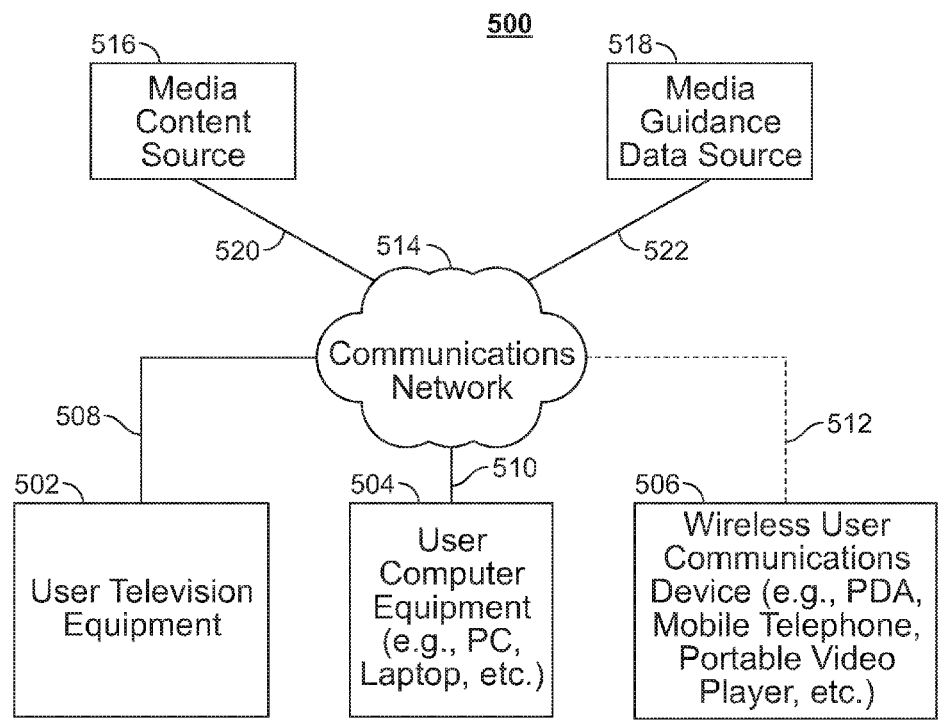
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
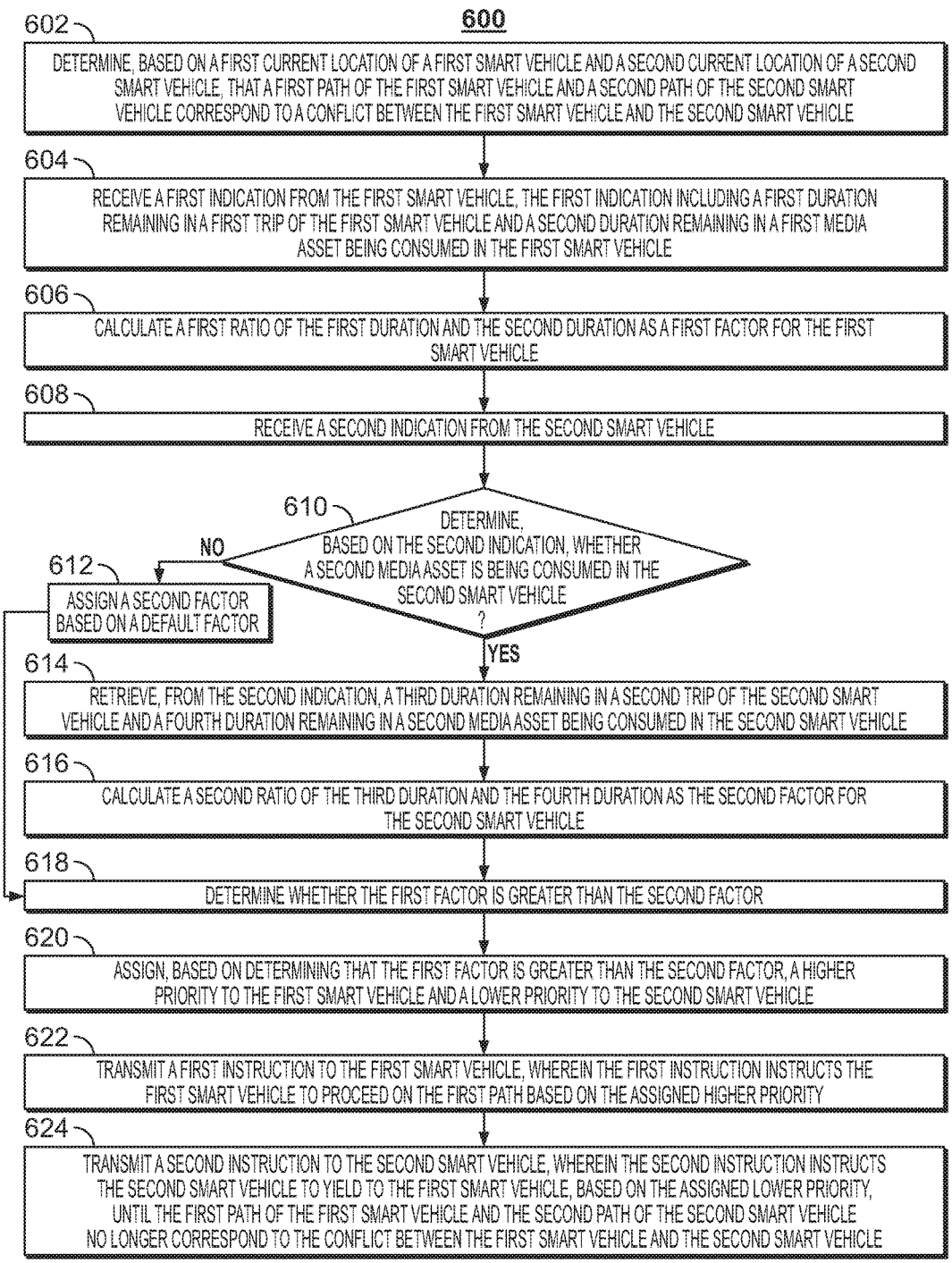
FIG. 6 is a flowchart of illustrative steps for resolving conflicts between paths of smart vehicles based on time remaining in media assets being consumed in the smart vehicles, in accordance with some embodiments of the disclosure.

FIG. 6 is a flowchart of illustrative steps for authorizing operations associated with blocked media assets using two-factor authentication, in accordance with some embodiments of the disclosure. For example, a media guidance application implementing process 600 may be executed by control circuitry 404 (FIG. 4). It should be noted that process 600 or any step thereof could be performed on, or provided by, control circuitry of any of the devices or equipment shown in FIGS. 4-5. Alternatively or additionally, process 600 or any step thereof could be performed on, or provided by, control circuitry of a smart vehicle, a server, distributed network of servers, or any other suitable device configured to communicate with smart vehicles.

Process 600 begins at 602, where control circuitry 404 determines, based on a first current location of a first smart vehicle and a second current location of a second smart vehicle, that a first path of the first smart vehicle and a second path of the second smart vehicle correspond to a conflict between the first smart vehicle and the second smart vehicle. For example, control circuitry 404 may receive coordinates (e.g., GPS coordinates) from each smart vehicle defining their position, as well as the current speed (e.g., 20 miles per hour) and direction (e.g., north) each smart vehicle is traveling. Alternatively or additionally, control circuitry 404 may receive the locations, speed, and/or direction of the smart vehicles from sensors configured to detect smart vehicles (e.g., motion sensors near an intersection). Control circuitry 404 may then determine paths of the smart vehicles. For example, based on the location, speed, and direction of each smart vehicle, control circuitry 404 may determine (e.g., based on kinematic models) the probable locations (i.e., path) at future times for each smart vehicle. Control circuitry 404 may determine that, based on the paths of the two smart vehicles, the two smart vehicles will intersect at a future time. Based on the determination, control circuitry 404 may determine that the two paths of the two smart vehicles conflict (e.g., one will need to yield to the other).

Process 600 continues to 604, where control circuitry 404 receives a first indication from the first smart vehicle, the first indication including a first duration remaining in a first trip of the first smart vehicle and a second duration remaining in a first media asset being consumed in the first smart vehicle. For example, control circuitry 404 may receive data from a smart vehicle (e.g., transmitted via communications network 514) corresponding to the duration remaining in a trip of the smart vehicle and the amount of time remaining in a media asset being consumed in the smart vehicle (e.g., on any of the user equipment discussed in FIG. 4-5). Control circuitry 404 may receive the data in fields of a status table transmitted by a smart vehicle. For example, the status table may contain values (e.g., integers) for the duration remaining in a trip of the smart vehicle and the duration remaining in a media asset being consumed in the smart vehicle. In some embodiments, the status table may contain the current speed, direction, destination coordinates, and/or an indication of whether a media asset is being consumed in the smart vehicle.

Process 600 continues to 606, where control circuitry 404 calculates a first ratio of the first duration and the second duration as a first factor for the first smart vehicle. For example, control circuitry 404 may divide the duration of time remaining in the first trip of the smart vehicle by the duration of time remaining in a media asset being consumed in the smart vehicle. As an example, if 20 minutes remain in the trip of the smart vehicle and 40 minutes remain in a media asset being consumed, then control circuitry 404 may calculate 0.5 as the ratio. Control circuitry 404 may store the ratio (e.g., in storage 408) as the first factor to use when determining whether the first or second smart vehicle should proceed first (e.g., to resolve the conflict).

Process 600 continues to 608, where control circuitry 404 receives a second indication from the second smart vehicle. For example, control circuitry 404 may receive data from another smart vehicle including status information (e.g., the status table as described above). For example, control circuitry 404 may receive data from a smart vehicle (e.g., transmitted via communications network 514) corresponding to the duration remaining in a trip of the second smart vehicle and the amount of time remaining in a media asset being consumed in the second smart vehicle.

Process 600 continues to 610, where control circuitry 404 determines based on the second indication, whether a second media asset is being consumed in the second smart vehicle. For example, control circuitry 404 may receive a status table (e.g., as the second indication) from the second smart vehicle including a Boolean value for whether a user in the second smart vehicle is consuming a media asset (e.g., on any of the user equipment discussed in FIG. 4-5). If the Boolean value is set to "true," then control circuitry 404 may determine that a media asset is also being consumed in the second smart vehicle, and may calculate a second ratio, as described above with respect to step 606 for the first smart vehicle. If the Boolean value is set to "false," then control circuitry 404 may determine that a media asset is not being consumed by a user in the second smart vehicle.

If, at 610, control circuitry 404 determines that the second media asset is not being consumed in the second smart vehicle, process 600 continues to 612, where control circuitry 404 assigns a second factor based on a default factor. For example, if control circuitry 404 determines that a Boolean value (e.g., as described above with respect to 610) for whether a media asset is being consumed is "false" for the second smart vehicle, control circuitry 404 may assign a default value to the second smart vehicle. For example, the default value may be any value that can be compared to the first factor of the first smart vehicle. Specifically, if the first factor is an integer, then the default may also be an integer of any value. The default value may be the same for all smart vehicles, or may be customized based on user preferences, an amount of time remaining in the trip of the second smart vehicle, or other attributes associated with the second smart vehicle. After control circuitry 404 assigns the second factor at 612, process 600 continues to 618, described further below.

If, at 610, control circuitry 404 determines that the second media asset is being consumed in the second smart vehicle, process 600 continues to 614, where control circuitry 404 retrieves, from the second indication, a third duration remaining in a second trip of the second smart vehicle and a fourth duration remaining in a second media asset being consumed in the second smart vehicle. For example, as described above for the first smart vehicle (e.g., in step 604), control circuitry 404 may receive data from a smart vehicle (e.g., transmitted via communications network 514) corresponding to the duration remaining in a trip of the smart vehicle and the amount of time remaining in a media asset being consumed in the smart vehicle. Control circuitry 404 may retrieve the data in fields of a status table transmitted by a smart vehicle as described above. In some embodiments, the duration of time remaining in the media asset and the duration of time remaining in the trip of the second smart vehicle are received in a single transmission from the smart vehicle. In other embodiments, control circuitry 404 requests the values for the duration of time remaining in the media asset and the duration of time remaining in the trip of the second smart vehicle in response to receiving a first transmission indicating that a user in the second smart vehicle is consuming a media asset.

Process 600 continues to 616, where control circuitry 404 calculates a second ratio of the third duration and the fourth duration as the second factor for the second smart vehicle. For example, based on the received duration of the second trip of the smart vehicle and the received duration remaining in a media asset being consumed in the second smart vehicle, control circuitry 404 may calculate a second ratio (e.g., by dividing the two values). As a specific example, if 30 minutes remain in the trip of the smart vehicle and 15 minutes remain in a media asset being consumed, then control circuitry 404 may calculate 2.0 as the ratio. Control circuitry 404 may store the ratio as the second factor to use when determining whether the first or second smart vehicle should proceed first (e.g., to resolve the conflict).

Process 600 continues to 618, where control circuitry 404 determines whether the first factor is greater than the second factor. For example, control circuitry 404 may compare values for the first factor and the second factor to determine which is greater (e.g., by subtracting the two values and determining whether the difference is positive or negative). If the first and second factors are equal, or within a threshold, control circuitry 404 may determine that a different criterion should be utilized to determine which vehicle proceeds first. For example, control circuitry 404 may randomly select a vehicle (e.g., based on a random number generator) and instruct that vehicle to proceed first.

Process 600 continues to 620, where control circuitry 404 assigns, based on determining that the first factor is greater than the second factor, a higher priority to the first smart vehicle and a lower priority to the second smart vehicle. If a user in the second smart vehicle was determined to not be consuming a media asset, then control circuitry 404 compares the default value to the first factor to determine which is greater. If the user in the second smart vehicle was determined to be consuming a media asset, then control circuitry 404 compares the first and second factors to determine which is greater. Based on which factor is greater, control circuitry 404 assigns a priority to each vehicle. For example, the priority may be a value ranking the order in which the two vehicles should proceed (e.g., integers "1" and "2").

Process 600 continues to 622, where control circuitry 404 transmits a first instruction to the first smart vehicle, wherein the first instruction instructs the first smart vehicle to proceed on the first path based on the assigned higher priority. For example, based on the assigned priority for the first smart vehicle being higher than the assigned priority for the second smart vehicle, control circuitry 404 may transmit a data packet (e.g., via communications network 514) containing an indication (e.g., a string of text such as, "Go") that instructs the first smart vehicle to continue traveling on the first path immediately. As a specific example, control circuitry 404 may instruct the first smart vehicle to enter an intersection, pass another vehicle, land before another vehicle, etc. based on the higher priority.

Process 600 continues to 624, where control circuitry 404 transmits a second instruction, wherein the second instruction instructs the second smart vehicle to yield to the first smart vehicle, based on the assigned lower priority, until the first path of the first smart vehicle and the second path of the second smart vehicle no longer correspond to the conflict between the first smart vehicle and the second smart vehicle. For example, based on the assigned lower priority than the first smart vehicle, control circuitry 404 may transmit a data packet (e.g., via communications network 514) containing an indication to yield (e.g., a string of text such as, "yield") and an identifier of the vehicle to yield to (e.g., an identifier of the first smart vehicle). After the vehicle that the second smart vehicle was instructed to yield to is no longer in the second path of the second smart vehicle, the second smart vehicle may proceed. Control circuitry 404 may monitor (e.g., by using motion sensors) the two smart vehicles and instruct the second smart vehicle when to proceed again, or the second smart vehicle may use embedded sensors and proceed without further transmission to or from control circuitry 404.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

Figure 7:
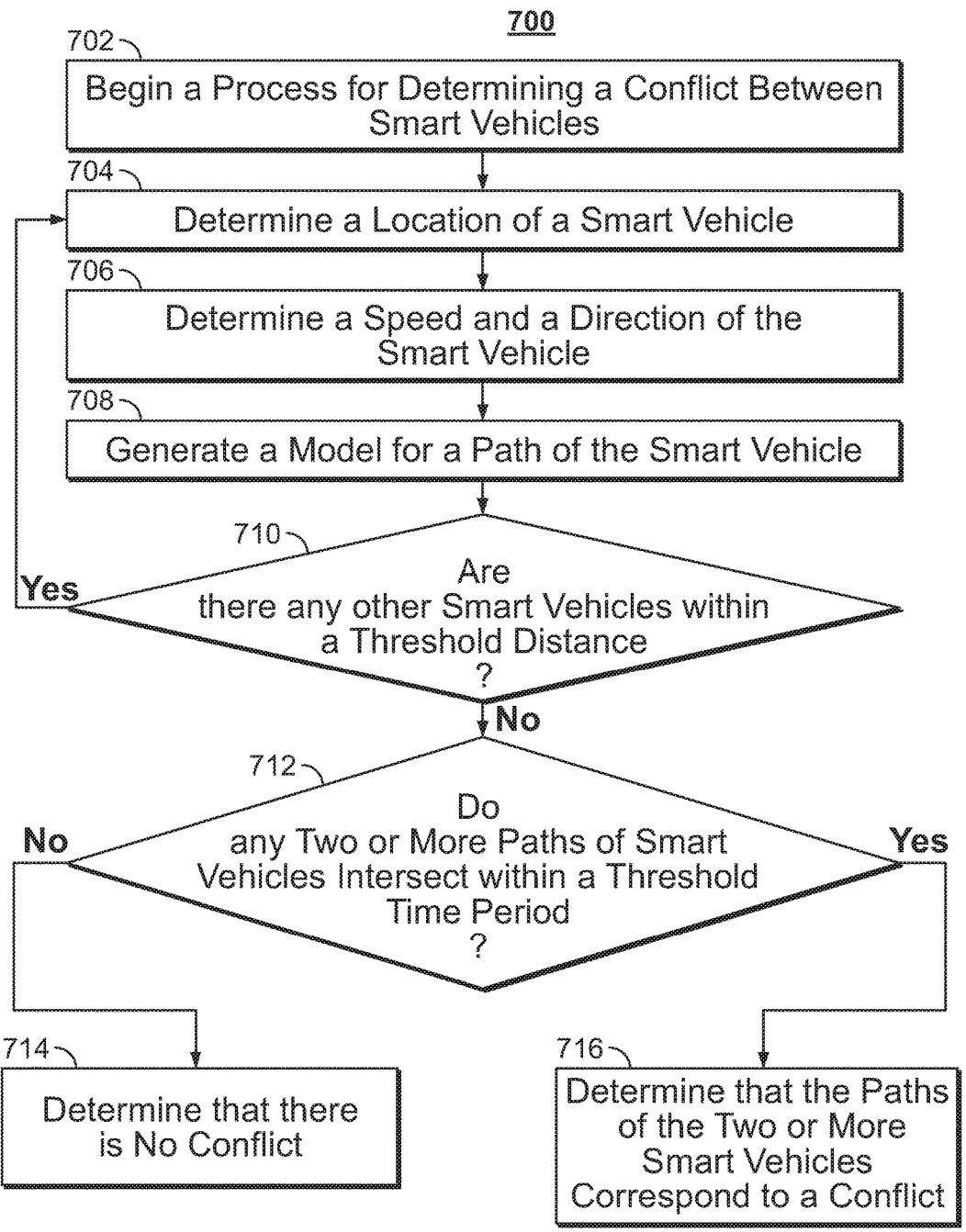
FIG. 7 is a flowchart of illustrative steps for determining a conflict between smart vehicles, in accordance with some embodiments of the disclosure.

FIG. 7 is a flowchart of illustrative steps for determining a conflict between smart vehicles, in accordance with some embodiments of the disclosure. For example, a media guidance application implementing process 700 may be executed by control circuitry 404 (FIG. 4). It should be noted that process 700 or any step thereof could be performed on, or provided by, control circuitry of any of the devices or equipment shown in FIGS. 4-5. Alternatively or additionally, process 700 or any step thereof could be performed on, or provided by, control circuitry of a smart vehicle, a server, distributed network of servers, or any other suitable device configured to communicate with smart vehicles. Process 700 starts with 702, where control circuitry 404 begins a process for determining a conflict between smart vehicles. For example, control circuitry 404 may execute a program script initializing process 700.

Process 700 continues to 704, where control circuitry 404 determines a location of a smart vehicle. For example, control circuitry 404 may receive an indication of the current location of a smart vehicle from a sensor. As a specific example, the sensor may be a motion sensor located at an intersection of two roads that determines that a vehicle is approaching an intersection at a particular speed and is currently located at a specific set of GPS coordinates. Alternatively or additionally, the smart vehicle may transmit GPS coordinates or other identifying information of a current location.

Process 700 continues to 706, where control circuitry 404 determines a speed and a direction of the smart vehicle. For example, control circuitry 404 may receive an indication of the velocity (e.g., a speed and direction) from a sensor. As a specific example, the sensor may be a motion sensor located at an intersection of two roads that determines that a vehicle is approaching an intersection at a particular speed (e.g., based on analyzing previous locations of the smart vehicle and times between those locations). Alternatively or additionally, the smart vehicle may transmit GPS coordinates or other identifying information of the current velocity.

Process 700 continues to 708, where control circuitry 404 generates a model for a path of the smart vehicle. For example, control circuitry 404 may determine a path of a smart vehicle by using kinematic models, as described above with respect to FIG. 1. Control circuitry 404 may utilize additional variables and terms in a kinematic model to determine the path of a smart vehicle (e.g., acceleration) for a potentially more accurate determination of a path. For example, the control circuitry may factor in the traffic conditions, preferences from a user profile (e.g., for the smart vehicle to travel below a certain speed), weather conditions, and/or any other parameter that may affect the rate at which smart vehicles travel.

Process 700 continues to 710, where control circuitry 404 determines if there are any other smart vehicles within a threshold distance. For example, control circuitry 404 may monitor a particular intersection or geographic area for conflicts. Control circuitry 404 may determine paths of each smart vehicle in the geographic area being monitored for conflicts to determine if any paths of smart vehicles will cause a conflict. Specifically, control circuitry 404 may iteratively update locations and/or velocities of smart vehicles in real-time and re-determine paths of the vehicles in order to determine whether a conflict arises between any two or more smart vehicles.

If, at 710, control circuitry 404 determines that there are other smart vehicles within a threshold distance, process 700 returns to 704, where control circuitry 404 determines the location of another smart vehicle. For example, control circuitry 404, based on GPS coordinates received from smart vehicles, may determine that another smart vehicle is also within a geographic area being monitored by control circuitry 404. Alternatively or additionally, control circuitry 404 may determine, based on the GPS coordinates for another smart vehicle, which the other smart vehicle is within a threshold distance of at least one other smart vehicle. Specifically, control circuitry 404 may determine that if two vehicles are close to one another, the paths of both vehicles should be determined to ensure a conflict is resolved promptly. For each smart vehicle, control circuitry 404 may perform steps 704 through 708 to calculate a model for the path. Once a model of a path for every smart vehicle within the threshold distance (e.g., the geographic area monitored by control circuitry 404 or within a threshold distance of another vehicle) is generated, then process 700 continues to 712 described below, where the paths are compared to determine whether a conflict will arise.

If, at 710, control circuitry 404 determines that there are not any other smart vehicles within a threshold distance, process 700 continues to 712, where control circuitry 404 determines if any two or more paths of smart vehicles intersect within a threshold time period. For example, control circuitry 404 may compare each model for the path of a particular smart vehicle with models for paths of every other smart vehicle within the threshold distance. Specifically, if five smart cars are near an intersection, the path of each vehicle is compared to the paths of the other four. For example, each model may contain probable locations for a smart vehicle at future times. Based on the probable locations, control circuitry 404 may determine whether two or more vehicles will pass within a threshold distance at a given time corresponding to a conflict (e.g., there is a high probability the two vehicles will collide).

If, at 712, control circuitry 404 determines that there are not two or more paths that intersect within the threshold time period, process 700 returns to 714, where control circuitry 404 determines that there is no conflict. For example, if control circuitry 404 determines based on the models for the paths of every smart vehicle within the threshold distance that there is a below threshold probability that any two or more vehicles will collide, control circuitry 404 may take no further action (e.g., no instructions to yield or proceed are necessary for control circuitry 404 to transmit).

If, at 712, control circuitry 404 determines that there are two or more paths that intersect within the threshold time period, process 700 returns to 716, where control circuitry 404 determines that the paths of the two or more smart vehicles correspond to a conflict. For example, if control circuitry 404 determines based on the models for the paths of every smart vehicle within the threshold distance that there is a greater than threshold probability that any two or more vehicles will collide, control circuitry 404 may take action to resolve the conflict and transmit instructions to smart vehicles to either yield or proceed, e.g., as described in FIGS. 1 and 6.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

Figure 8:
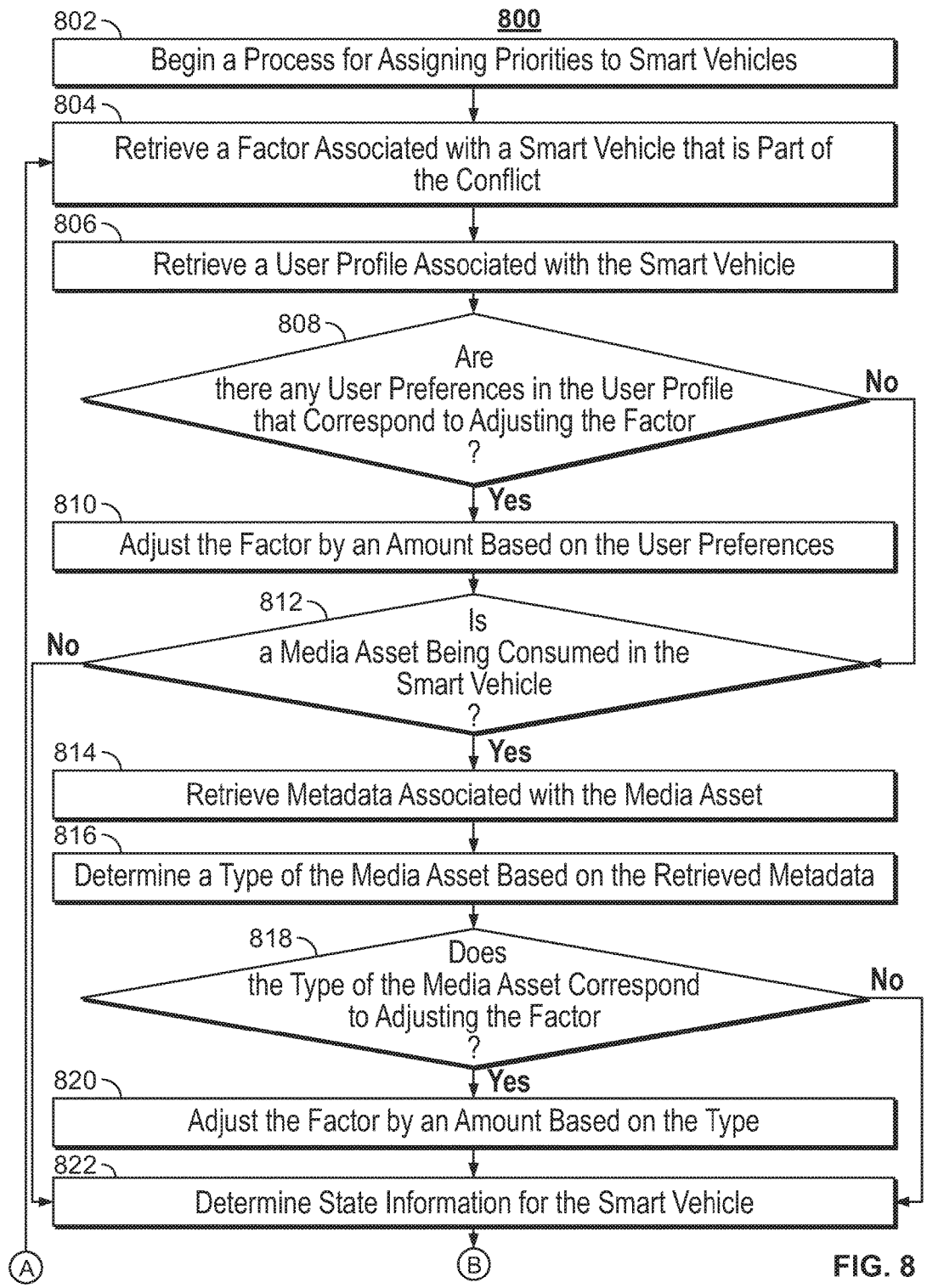
FIG. 8 is a flowchart of illustrative steps for assigning priorities to smart vehicles, in accordance with some embodiments of the disclosure.
Figure 8:
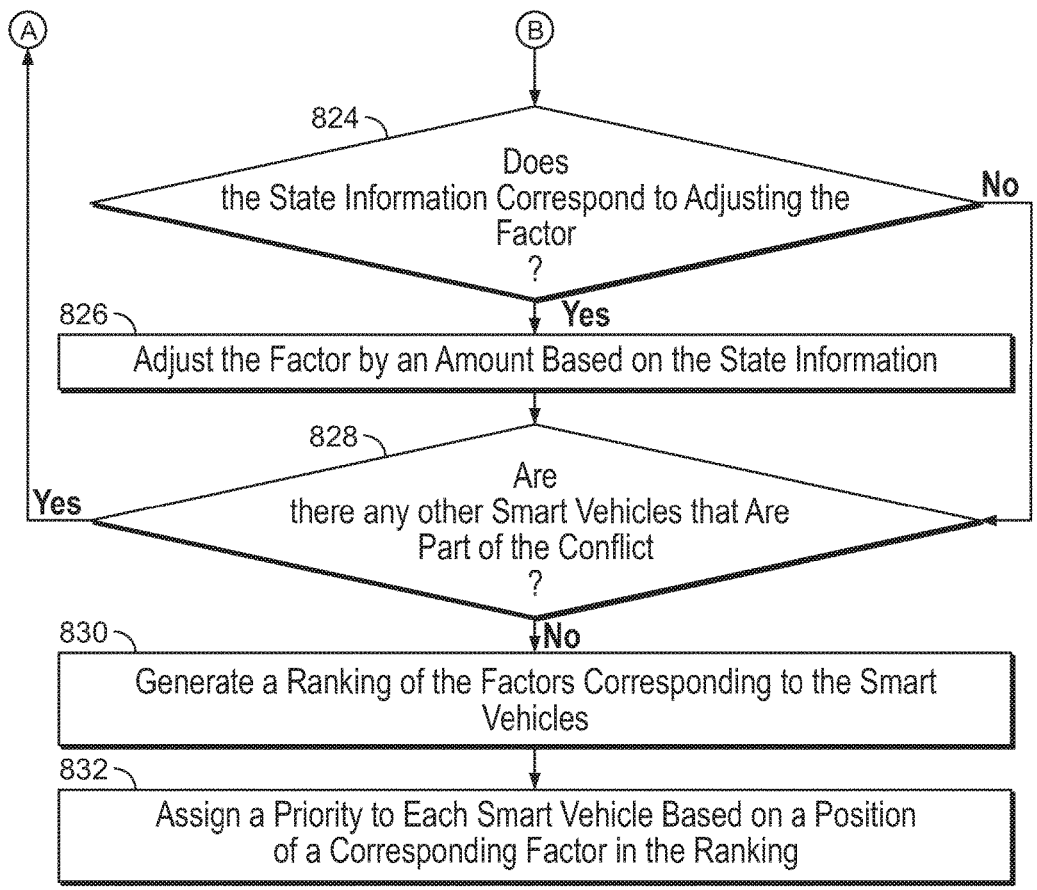

FIG. 8 is a flowchart of illustrative steps for assigning priorities to smart vehicles, in accordance with some embodiments of the disclosure. For example, a media guidance application implementing process 800 may be executed by control circuitry 404 (FIG. 4). It should be noted that process 800 or any step thereof could be performed on, or provided by, control circuitry of any of the devices or equipment shown in FIGS. 4-5. Alternatively or additionally, process 700 or any step thereof could be performed on, or provided by, control circuitry of a smart vehicle, a server, distributed network of servers, or any other suitable device configured to communicate with smart vehicles. Process 800 starts with 802, where control circuitry 404 begins a process for assigning priorities to smart vehicles. For example, control circuitry 404 may execute a program script initializing process 800.

Process 800 continues to 804, where control circuitry 404 retrieves a factor associated with a smart vehicle that is part of the conflict. For example, control circuitry 404 may retrieve a factor stored locally (e.g., in storage 408) or remotely (e.g., at media guidance data source 518 accessible via communications network 514). For example, for each determined conflict, control circuitry 404 may generate a list, array or other suitable data structure including identifiers of smart vehicles and associated factors. Control circuitry 404 may then modify the factors before assigning the priorities of the smart vehicles, as described further below.

Process 800 continues to 806, where control circuitry 404 retrieves a user profile associated with the smart vehicle. For example, control circuitry 404 may retrieve a user profile associated with the vehicle itself, users associated with the vehicle, or users determined to currently be passengers in the vehicle (e.g., based on data transmitted from the smart vehicle). The user profile may be stored locally (e.g., in storage 408) or remotely (e.g., at media guidance data source 518 accessible via communications network 514).

Process 800 continues to 808, where control circuitry 404 determines if there are any user preferences in the user profile that correspond to adjusting the factor. For example, the user profile may contain an indication (e.g., a Boolean value set to "false") to turn off media asset viewing progress as a parameter when determining which vehicle proceeds first (e.g., because the user does not like to wait at intersections even when it means a media asset will not be finished before a destination is reached). As another example, the stored user preference could be a different preference for finishing media assets based on the type of media asset. For example, the user may be more amenable to waiting at an intersection so that he or she can finish a movie, but less so to finish a news story. Based on the types of user preferences stored in the user profile, control circuitry 404 may determine whether any stored user preference corresponds to adjusting the value of the factor.

If, at 808, control circuitry 404 determines there is a user preference in the user profile that corresponds to adjusting the factor, process 800 continues to 810, where control circuitry 404 adjusts the factor by an amount based on the user preference. For example, the stored user preferences in the user profile may be associated with particular instructions (e.g., either in the user profile or in a separate data structure in storage 408 or remote at media guidance data source 518) to adjust the first factor by a given amount. Control circuitry 404 may then adjust the first factor by the amount. For example, control circuitry 404 may retrieve the current value for the first factor and, based on the amount, generate a new value for the first factor (e.g., adjusted by the amount). Control circuitry 404 may store the new value as the first factor. Process 800 then continues to 812, where control circuitry 404 determines whether a media asset is being consumed in the smart vehicle, as described further below.

If, at 808, control circuitry 404 determines there is not a user preference in the user profile that corresponds to adjusting the factor, process 800 continues to 812, where control circuitry 404 determines if there is a media asset being consumed in the smart vehicle. For example, control circuitry 404 may receive a status table including a Boolean value for whether a user in the smart vehicle is consuming a media asset. If the Boolean value is set to "true," then the control circuitry may determine that a media asset is also being consumed in the second smart vehicle, and may further determine characteristics of the media asset and whether the characteristics are associated with an instruction to adjust the factor. If the Boolean value is set to "false," then the control circuitry may determine that a media asset is not being consumed by a user in the smart vehicle and process 800 may proceed to 822, described further below.

If, at 812, control circuitry 404 determines that a media asset is being consumed in the smart vehicle, process 800 continues to 814, where control circuitry 404 retrieves metadata associated with the media asset. For example, control circuitry 404 may receive an indication of a genre, actor, director, or other metadata associated with the media asset with the transmission from the smart vehicle that includes the amount of time remaining in the media asset and the amount of time remaining in the trip, as described above. Alternatively or additionally, control circuitry 404 may receive only an identifier of the media asset (e.g., a title) and may access media guidance data source 518 via communications network 514 to retrieve metadata associated with the media asset.

Process 800 continues to 816, where control circuitry 404 determines a type of the media asset based on the retrieved metadata. A type of media asset may be based on any single attribute of the media asset (e.g., genre, director, and/or actor) or any group that comprises a combination of single attributes (e.g., a group for "chick flicks" may be associated with the genres "romance" and "comedy"). For example, control circuitry 404 may determine a group to which the media asset belongs based on particular metadata. Specifically, if control circuitry 404 retrieves metadata for the first media asset such as "Michael Bay" as the director and "action," as the genre, control circuitry 404 may determine that a group that the media asset belongs to based on the metadata, such as "summer blockbusters."

Process 800 continues to 818, where control circuitry 404 determines whether the type of the media asset corresponds to adjusting the factor. For example, control circuitry 404 may access a database containing a plurality of entries for different types of media assets. For example, control circuitry 404 may iteratively compare the type of the first media asset with the types of media assets stored in the database (e.g., by executing a for-loop). Control circuitry 404 may determine that the type corresponds to a first type of the plurality of types stored in the data structure. For example, based on each character of a string of characters for the type of the first media asset (e.g., "drama") matching each character of a string of characters for a type in a particular entry, control circuitry 404 may determine that the two correspond.

If, at 818, control circuitry 404 determines that the type of the media asset corresponds to adjusting the factor, process 800 continues to 820, where control circuitry 404 adjusts the factor by an amount based on the type. For example, control circuitry 404 may retrieve, from a field associated with the matched first type in the database, an instruction corresponding to the first type. The instruction may be to increase, decrease, multiple, divide, or perform any other mathematical operation to the first factor by a particular amount. Control circuitry 404 may then adjust the first factor based on the first adjustment instruction. For example, control circuitry 404 may retrieve the current value for the first factor and, based on the adjustment instruction, generate a new value for the first factor (e.g., adjusted by the adjustment factor). Control circuitry 404 may store the new value as the first factor.

If, at 818, control circuitry 404 determines that the type of the media asset does not correspond to adjusting the factor, process 800 continues to 822, where control circuitry 404 determines state information for the smart vehicle. For example, control circuitry 404 may receive information relating to the state of the smart vehicle, such as the amount of fuel remaining. Control circuitry 404 may receive the state information as part of data packet transmitted by the smart vehicle via communications network 514.

Process 800 continues to 824, where control circuitry 404 determines whether the state information corresponds to adjusting the factor. For example, control circuitry 404 may access a database containing a plurality of entries for different states of a smart vehicle. For example, control circuitry 404 may iteratively compare data relating to the state of the smart vehicle received from the smart vehicle with states of smart vehicles stored in the database (e.g., by executing a for-loop). Control circuitry 404 may determine that the state of the smart vehicle corresponds to a first state of the plurality of states stored in the data structure (e.g., if the amount of fuel remaining is below a threshold).

If, at 824, control circuitry 404 determines that the state information corresponds to adjusting the factor, process 800 continues to 826, where control circuitry 404 adjusts the factor by an amount based on the state information. For example, control circuitry 404 may retrieve, from a field associated with the matched state in the database, an instruction corresponding to the first type. The instruction may be to increase, decrease, multiple, divide, or perform any other mathematical operation to the first factor by a particular amount. After adjusting the factor, process 800 continues to 828, described further below.

If, at 824, control circuitry 404 determines that the state information corresponds to not adjusting the factor, process 800 continues to 828, where control circuitry 404 determines if there are any other smart vehicles that are part of the conflict. For example, control circuitry 404 may retrieve a stored list from storage 408 or media guidance database 518 via communications network 514 that contains identifiers of vehicles that are part of a conflict. Prior to assigning priorities, control circuitry 404 may determine whether a factor associated with each vehicle should be adjusted (e.g., perform steps 804 through 826). Control circuitry 404 may execute a for-loop to iterate through each identifier on the list to ensure that every parameter is analyzed for each vehicle that is part of the conflict. If a vehicle that is part of the conflict has not been analyzed, process 800 returns to 804, retrieves the factor associated with the vehicle and determines whether to adjust the factor.

If, at 828, control circuitry 404 determines that there are not any other smart vehicles that are part of the conflict, process 800 continues to 830, where control circuitry 404 generates a ranking of the factors corresponding to the smart vehicles. For example, control circuitry 404 may generate a new list with the adjusted factors for each smart vehicle that is part of the conflict and rank (e.g., from high to low) the smart vehicles. For example, after adjusting the factors, a first vehicle may have a factor of 2 and a second vehicle may have a factor of 1. In this instance, control circuitry 404 may place an identifier of the first vehicle above an identifier of the second vehicle in the ranked list. Control circuitry 404 may store the list in storage 408 or remotely at media guidance data source 518 accessible via communications network 514.

Process 800 continues to 832, where control circuitry 404 assigns a priority to each smart vehicle based on a position of a corresponding factor in the ranking. For example, based on which factor is greater (e.g., higher in a ranked list), control circuitry 404 assigns a priority to each vehicle. For example, the priority may be a value ranking the order in which the two vehicles should proceed (e.g., integers "1" and "2").

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

While some portions of this disclosure may make reference to "convention," any such reference is merely for the purpose of providing context to the invention(s) of the instant disclosure, and does not form any admission as to what constitutes the state of the art.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for resolving conflicts between paths of smart vehicles based on time remaining in media assets being consumed in the smart vehicles, the method comprising:
    determining, based on a first current location of a first smart vehicle and a second current location of a second smart vehicle, that a first path of the first smart vehicle and a second path of the second smart vehicle correspond to a conflict between the first smart vehicle and the second smart vehicle; and
    in response to determining the conflict:
        receiving a first indication from the first smart vehicle, the first indication including a first duration remaining in a first trip of the first smart vehicle and a second duration remaining in a first media asset being consumed in the first smart vehicle;
        calculating a first ratio of the first duration and the second duration as a first factor for the first smart vehicle;
        receiving a second indication from the second smart vehicle;
        determining, based on the second indication, whether a second media asset is being consumed in the second smart vehicle;
        in response to determining that the second media asset is not being consumed, assigning a second factor based on a default factor;
        determining whether the first factor is greater than the second factor;
        assigning, based on determining that the first factor is greater than the second factor, a higher priority to the first smart vehicle and a lower priority to the second smart vehicle;
        transmitting a first instruction to the first smart vehicle, wherein the first instruction instructs the first smart vehicle to proceed on the first path based on the assigned higher priority; and
        transmitting a second instruction, wherein the second instruction instructs the second smart vehicle to yield to the first smart vehicle, based on the assigned lower priority, until the first path of the first smart vehicle and the second path of the second smart vehicle no longer correspond to the conflict between the first smart vehicle and the second smart vehicle.

2. The method of claim 1, further comprising:
    in response to determining that the second media asset is being consumed in the second smart vehicle:
        retrieving, from the second indication, a third duration remaining in a second trip of the second smart vehicle and a fourth duration remaining in a second media asset being consumed in the second smart vehicle; and
        calculating a second ratio of the third duration and the fourth duration as the second factor for the second smart vehicle.

3. The method of claim 1, wherein the second instruction is transmitted to the second smart vehicle.

4. The method of claim 1, wherein the second instruction is transmitted to a signaling device that is part of traffic infrastructure, and wherein the signaling device instructs the second smart vehicle to yield to the first smart vehicle by generating a visual alert to the second smart vehicle.

5. The method of claim 1, wherein determining, based on the first current location of the first smart vehicle and the second current location of the second smart vehicle, that the first path of the first smart vehicle and the second path of the second smart vehicle correspond to the conflict between the first smart vehicle and the second smart vehicle comprises:
    determining the first path of the first smart vehicle based on the first current location and a first velocity of the first smart vehicle;
    determining the second path of the second smart vehicle based on the second current location and a second velocity of the second smart vehicle;
    calculating, based on the first path and the second path, a first time that the first smart vehicle and a second time that the second smart vehicle will reach an intersection;
    calculating a difference between the first time and the second time;
    determining whether the difference is less than a threshold time period; and
    in response to determining that the difference is less than the threshold time period, determining the conflict between the first smart vehicle and the second smart vehicle.

6. The method of claim 1, wherein assigning the second factor based on the default factor comprises:

retrieving, from the second indication, a third duration remaining in a second trip of the second smart vehicle;

comparing the third duration to a plurality of durations stored in a data structure, wherein each stored duration is associated with a default value;

determining that the third duration matches a stored duration of the plurality of durations; and retrieving the default value associated with the stored duration as the default factor.

7. The method of claim 1, further comprising:

retrieving metadata associated with the first media asset being consumed in the first smart vehicle;

determining a type of the first media asset based on the retrieved metadata;

comparing the type of the first media asset with a plurality of types stored in a data structure, wherein each stored type is associated with an adjustment instruction;

determining that the type corresponds to a first type of the plurality of types stored in the data structure;

retrieving a first adjustment instruction associated with the first type; and adjusting the first factor based on the first adjustment instruction.

8. The method of claim 1, wherein the conflict is a first conflict, further comprising:

storing, based on the first instruction transmitted to the first smart vehicle, a high priority indication associated with the first smart vehicle;

transmitting the high priority indication associated with the first smart vehicle to a server monitoring an intersection after the first conflict in the first trip of the first smart vehicle;

determining, by the server, that a third path of the first smart vehicle corresponds to a second conflict with a fourth path of a third smart vehicle at the intersection;

transmitting, based on the high priority indication, a third instruction to the first smart vehicle, wherein the third instruction instructs the first smart vehicle to proceed on the third path; and transmitting, based on the high priority indication, a fourth instruction to the third smart vehicle, wherein the fourth instruction instructs the third smart vehicle to yield to the first smart vehicle until the third path of the first smart vehicle and the fourth path of the third smart vehicle no longer correspond to the second conflict.

9. The method of claim 1, further comprising:

receiving a first confirmation of the transmitted first instruction from the first smart vehicle;

receiving a second confirmation of the transmitted second instruction from the second smart vehicle;

determining, based on the received first confirmation and the received second confirmation, whether the first instruction and the second instruction were properly received; and in response to determining that the first instruction and the second instruction were not properly received, re-transmitting the first instruction to the first smart vehicle and the second instruction to the second smart vehicle.

10. The method of claim 1, further comprising:

determining that the first media asset has been subject to a playback operation resulting in playback at a greater than normal speed; and based on determining that the first media asset has been subject to the playback operation, adjusting the first factor by an amount.

11. A system for resolving conflicts between paths of smart vehicles based on time remaining in media assets being consumed in the smart vehicles, the system comprising:

control circuitry configured to:

determine, based on a first current location of a first smart vehicle and a second current location of a second smart vehicle, that a first path of the first smart vehicle and a second path of the second smart vehicle correspond to a conflict between the first smart vehicle and the second smart vehicle; and in response to determining the conflict:

receive a first indication from the first smart vehicle, the first indication including a first duration remaining in a first trip of the first smart vehicle and a second duration remaining in a first media asset being consumed in the first smart vehicle;

calculate a first ratio of the first duration and the second duration as a first factor for the first smart vehicle;

receive a second indication from the second smart vehicle;

determine, based on the second indication, whether a second media asset is being consumed in the second smart vehicle;

in response to determining that the second media asset is not being consumed, assign a second factor based on a default factor;

determine whether the first factor is greater than the second factor;

assign, based on determining that the first factor is greater than the second factor, a higher priority to the first smart vehicle and a lower priority to the second smart vehicle;

transmit a first instruction to the first smart vehicle, wherein the first instruction instructs the first smart vehicle to proceed on the first path based on the assigned higher priority; and transmit a second instruction, wherein the second instruction instructs the second smart vehicle to yield to the first smart vehicle, based on the assigned lower priority, until the first path of the first smart vehicle and the second path of the second smart vehicle no longer correspond to the conflict between the first smart vehicle and the second smart vehicle.

12. The system of claim 11, wherein the control circuitry is further configured to:

in response to determining that the second media asset is being consumed in the second smart vehicle:

retrieve, from the second indication, a third duration remaining in a second trip of the second smart vehicle and a fourth duration remaining in a second media asset being consumed in the second smart vehicle; and calculate a second ratio of the third duration and the fourth duration as the second factor for the second smart vehicle.

13. The system of claim 11, wherein the second instruction is transmitted to the second smart vehicle.

14. The system of claim 11, wherein the second instruction is transmitted to a signaling device that is part of traffic infrastructure, and wherein the signaling device instructs the second smart vehicle to yield to the first smart vehicle by generating a visual alert to the second smart vehicle.

15. The system of claim 11, wherein the control circuitry is further configured, when determining, based on the first current location of the first smart vehicle and the second current location of the second smart vehicle, that the first path of the first smart vehicle and the second path of the second smart vehicle correspond to the conflict between the first smart vehicle and the second smart vehicle, to:
- determine the first path of the first smart vehicle based on the first current location and a first velocity of the first smart vehicle;
- determine the second path of the second smart vehicle based on the second current location and a second velocity of the second smart vehicle;
- calculate, based on the first path and the second path, a first time that the first smart vehicle and a second time that the second smart vehicle will reach an intersection;
- calculate a difference between the first time and the second time;
- determine whether the difference is less than a threshold time period; and
- in response to determining that the difference is less than the threshold time period, determine the conflict between the first smart vehicle and the second smart vehicle.

16. The system of claim 11, wherein the control circuitry is further configured, when assigning the second factor based on the default factor, to:
- retrieve, from the second indication, a third duration remaining in a second trip of the second smart vehicle;
- compare the third duration to a plurality of durations stored in a data structure, wherein each stored duration is associated with a default value;
- determine that the third duration matches a stored duration of the plurality of durations; and
- retrieving the default value associated with the stored duration as the default factor.

17. The system of claim 11, wherein the control circuitry is further configured to:
- retrieve metadata associated with the first media asset being consumed in the first smart vehicle;
- determine a type of the first media asset based on the retrieved metadata;
- compare the type of the first media asset with a plurality of types stored in a data structure, wherein each stored type is associated with an adjustment instruction;
- determine that the type corresponds to a first type of the plurality of types stored in the data structure;
- retrieve a first adjustment instruction associated with the first type; and
- adjust the first factor based on the first adjustment instruction.

18. The system of claim 11, wherein the conflict is a first conflict, and wherein the control circuitry is further configured to:
- store, based on the first instruction transmitted to the first smart vehicle, a high priority indication associated with the first smart vehicle;
- transmit the high priority indication associated with the first smart vehicle to a server monitoring an intersection after the first conflict in the first trip of the first smart vehicle;
- determine, by the server, that a third path of the first smart vehicle corresponds to a second conflict with a fourth path of a third smart vehicle at the intersection;
- transmit, based on the high priority indication, a third instruction to the first smart vehicle, wherein the third instruction instructs the first smart vehicle to proceed on the third path; and
- transmit, based on the high priority indication, a fourth instruction to the third smart vehicle, wherein the fourth instruction instructs the third smart vehicle to yield to the first smart vehicle until the third path of the first smart vehicle and the fourth path of the third smart vehicle no longer correspond to the second conflict.

19. The system of claim 11, wherein the control circuitry is further configured to:
- receive a first confirmation of the transmitted first instruction from the first smart vehicle;
- receive a second confirmation of the transmitted second instruction from the second smart vehicle;
- determine, based on the received first confirmation and the received second confirmation, whether the first instruction and the second instruction were properly received; and
- in response to determining that the first instruction and the second instruction were not properly received, re-transmit the first instruction to the first smart vehicle and the second instruction to the second smart vehicle.

20. The system of claim 11, wherein the control circuitry is further configured to:
- determine that the first media asset has been subject to a playback operation resulting in playback at a greater than normal speed; and
- based on determining that the first media asset has been subject to the playback operation, adjust the first factor by an amount.

* * * * *